United States Patent [19]

Beck et al.

[11] Patent Number: 5,256,776
[45] Date of Patent: Oct. 26, 1993

[54] WATER-SOLUBLE PHTHALOCYANINE DYESTUFFS, PROCESSES FOR THEIR PREPARATION AND THEIR USE

[75] Inventors: Thomas Beck, Bad Soden am Taunus; Werner H. Russ, Flösheim am Main; Hartmut Springer, Königstein/Taunus; Marcus Bänfer, Bad Soden am Taunus, all of Fed. Rep. of Germany

[73] Assignee: Hoechst Aktiengesellschaft, Frankfurt, Fed. Rep. of Germany

[21] Appl. No.: 936,138

[22] Filed: Aug. 27, 1992

[30] Foreign Application Priority Data

Aug. 28, 1991 [DE] Fed. Rep. of Germany ....... 4128511

[51] Int. Cl.$^5$ ..................... C09B 62/016; D06P 1/38; D06P 3/10; D06P 3/66
[52] U.S. Cl. ..................... 540/126
[58] Field of Search ..................... 540/126

[56] References Cited

U.S. PATENT DOCUMENTS

| | | | |
|---|---|---|---|
| 3,504,998 | 4/1970 | Speier | 8/581 |
| 3,512,915 | 5/1970 | Speier | 8/523 |
| 4,505,714 | 3/1985 | Omura et al. | 8/549 |
| 4,693,725 | 9/1987 | Yamauchi et al. | 8/549 |
| 4,812,558 | 3/1989 | Omura et al. | 534/618 |

FOREIGN PATENT DOCUMENTS

| | | | |
|---|---|---|---|
| 73267 | 3/1983 | European Pat. Off. | |
| 3405204 | 8/1984 | Fed. Rep. of Germany | 540/129 |
| 836647 | 6/1960 | United Kingdom | |
| 90/13604 | 11/1990 | World Int. Prop. O. | |

OTHER PUBLICATIONS

Hashizume et al., Chemical Abstracts, vol. 62, 1965, Abstract 16422g.

*Primary Examiner*—Mark L. Berch
*Attorney, Agent, or Firm*—Connolly & Hutz

[57] ABSTRACT

Water-soluble phthalocyanine dyestuffs, processes for their preparation and their use Phthalocyanine dyestuffs, in particular copper phthalocyanine and nickel phthalocyanine dyestuffs, which contain one or more groups of the formula define below

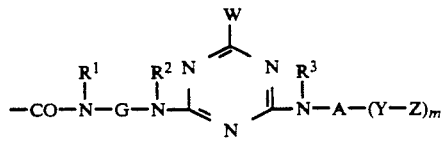

or one or more carboxy groups, or both groups, and which furthermore can have one or more sulfo groups, customary sulfonamide groups and/or groups of the general formula defined below

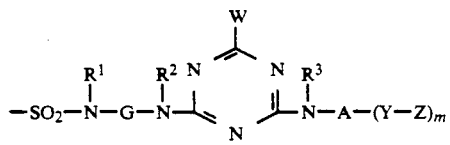

dye materials containing hydroxy and/or carboxamide groups, in particular fiber materials, such as, for example, cellulose fiber materials, wool and polyamide fibers, in deep-colored, fast, mainly green shades. In the formulae:

$R^1$ and $R^2$ are both, independently of one another, hydrogen or a lower optionally substituted aliphatic radical, G is lower alkylene, or is phenylene, which can be substituted by lower alkyl, lower alkoxy, halogen, sulfo, carboxy and/or nitro, or the grouping —N($R^1$)—G—N($R^2$)— forms the bivalent radical of a saturated heterocyclic ring, W is halogen, lower alkoxy, aryloxy, sulfo, phenylsulfonyl, lower alkylsulfonyl or an optionally substituted amino group, or is a radical of the formula —N($R^3$)—A—(Y—Z)$_m$, where $R^3$, A, Y, Z and m have the meaning given below, A is an aromatic carbocyclic or aromatic heterocyclic radical or an alkylene radical, which can be interrupted by 1 or 2 hetero groups, or is an alkylenephenylene radical or the bivalent radical of a saturated heterocyclic ring containing two N atoms, Y, in the case where A is an aromatic radical, is a direct bond or a carbamoyl-alkylene group or a methylene, ethylene, methylamino or β-cyanoethyl-amino group, or Y is lower alkylene, and in this case A necessarily is a direct bond and m is 2, Z is a fiber-reactive group of the vinylsulfone series, m is the number 1 or 2 and $R^3$ is hydrogen or lower alkyl.

18 Claims, No Drawings

WATER-SOLUBLE PHTHALOCYANINE DYESTUFFS, PROCESSES FOR THEIR PREPARATION AND THEIR USE

Water-soluble phthalocyanine dyestuffs, processes for their preparation and their use.

The invention relates to the technical field of fiber-reactive dyestuffs.

The practice of dyeing using reactive dyestuffs has recently led to increased requirements in respect of the quality of the dyeings and the economy of the dyeing process. Consequently, there is still a demand for novel reactive dyestuffs, in respect not only of the fastness properties of the dyeings obtainable with them, but also of an increased degree of fixing of the dyestuffs to the material to be dyed. Fiber-reactive phthalocyanine dyestuffs are known, for example, from European Patent Application Publication No. 0,073,267A and U.S. Pat. Nos. 4,505,714, 4,693,725 and 4,812,558; they contain, bonded via an N-aryl- or N-alkyl-sulfonamide radical, a fiber-reactive group from the halogenotriazine series, and additionally a fiber-reactive radical from the vinyl sulfone series. In spite of the very good dyeing properties of these known dyestuffs, it was desirable to develop dyestuffs which have an increased degree of fixing and produce dyeings having a better coloristic depth of color.

With the present invention, novel water-soluble improved phthalocyanine dyestuffs have now been found, with which high-quality dyeings in a brilliant green are obtained and which correspond to the general formula (1) (the formula (1) and also the formulae mentioned below are drawn on sheets of formulae after the Examples).

In formula (1):

Pc is the radical of metal-free or a metal-containing phthalocyanine, such as, for example, of copper phthalocyanine, cobalt phthalocyanine or nickel phthalocyanine, in which the phthalocyanine radical can also be substituted in the 3- and/or 4-positions of the carbocyclic aromatic rings of the phthalocyanine, such as, for example, by halogen atoms, such as chlorine atoms, or aryl radicals, such as phenyl radicals, and in which the sulfonamide and/or sulfo groups are bonded in the 3- and/or 4-positions of the carbocyclic aromatic rings of the phthalocyanine;

$R^1$ is hydrogen or a lower aliphatic radical, in particular lower alkyl, which can be substituted, preferably hydrogen;

$R^2$ is hydrogen or a lower aliphatic radical, in particular lower alkyl, which can be substituted, preferably hydrogen;

$R^3$ is hydrogen or alkyl having 1 to 4 carbon atoms, such as methyl and ethyl, preferably hydrogen;

$R^4$ is hydrogen or lower alkyl, which can be substituted, or cycloalkyl having 5 to 8 carbon atoms, such as cyclohexyl;

$R^5$ is hydrogen or lower alkyl, which can be substituted, or aryl, which can be substituted, or is cyano; or $R^4$ and $R^5$, together with the nitrogen atom and an alkylene radical having 3 to 8 carbon atoms, preferably 4 to 6 carbon atoms, or with a further hetero atom, such as a nitrogen atom or an oxygen atom., and two lower alkylene radicals, form the radical of a 4- to 8-membered heterocyclic ring, such as, for example, the N-piperidino, N-piperazino or N-morpholino radical, or $-NR^4R^5$ is a radical of the formula (2), in which $R^3$, A, Y, Z and m have one of the abovementioned meanings;

G is alkylene having 1 to 6 carbon atoms, in particular 2 to 4 carbon atoms, such as ethylene or propylene, or is phenylene, preferably para-phenylene and in particular meta-phenylene, which can be substituted by 1 to 4 substituents, preferably 1 or 2 substituents, from the group comprising alkyl having 1 to 4 carbon atoms, such as ethyl and in particular methyl, alkoxy having 1 to 4 carbon atoms, such as ethoxy and in particular methoxy, halogen, such as chlorine and bromine, sulfo, carboxy and nitro, preferably methyl, ethyl, methoxy, ethoxy, sulfo and carboxy:, or the grouping $-N(R^1)-G-N(R^2)-$ together forms the bivalent radical of a saturated heterocyclic ring, such as the 1,4-piperazidinylene radical;

W is halogen, such as chlorine and fluorine, alkoxy having 1 to 4 carbon atoms, such as methoxy and ethoxy, aryloxy, sulfo, phenylsulfonyl, alkylsulfonyl having 1 to 4 carbon atoms, such as methylsulfonyl and ethylsulfonyl, or an amino group of the general formula $-NR^6R^7$, in which $R^6$ has one of the meanings given above for $R^4$, and $R^7$ has one of the meanings given above for $R^5$, or W is a radical of the abovementioned general formula 2), in which $R^3$, A, Y, Z and m have one of the abovementioned meanings;

A is an aromatic carbocyclic or aromatic heterocyclic radical, preferably an optionally substituted phenylene or naphthylene radical, in particular a phenylene or naphthylene radical, both of which can be substituted by 1 to 3 substituents from the group comprising lower alkyl, such as methyl and ethyl, lower alkoxy, such as methoxy and ethoxy, halogen, such as chlorine and bromine, carboxy , nitro and sulfo, or is an alkylene radical having 1 to 8 carbon atoms, preferably 2 to 6 carbon atoms, or an alkylene radical having 2 to 8 carbon atoms, which can be interrupted by 1 or 2 hetero groups, such as $-O-$ or $-NH-$, or is a radical of the formula -alkphenylene, in which alk is an alkylene radical having 1 to 4 carbon atoms, such as methylene or ethylene, and phenylene is a phenylene radical, such as meta-phenylene and in particular para-phenylene, or A is a radical of the general formula (3), in which n is an integer from 2 to 4 and alkylen is an alkylen radical having 1 to 6 carbon atoms, preferably 1 to 4 carbon atoms;

Y in the case where A is an aromatic radical is a direct bond or a group of the formula $-CO-NH$-alkylen, where alkylen has the above meaning, or is a group of the formula

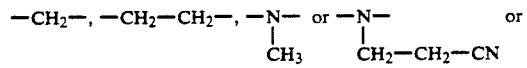

Y is alkylene having 2 to 6 carbon atoms, preferably 2 to 4 carbon atoms, such as 1,2-ethylene or 1,3-propylene, in which case $-A-$ is necessarily a direct bond and m is 2;

Z is vinylsulfonyl, or is ethylsulfonyl which contains, in the β-position, a substituent which can be eliminated under alkaline conditions, such as, for example, β-chloroethylsulfonyl, β-acetoxyethylsulfonyl, β-thiosulfatoethylsulfonyl or β-phosphatoethylsulfonyl, preferably β-sulfatoethylsulfonyl;

a is an integer from zero to 4, preferably zero, 1 or 2, in particular 1 or 2;

b is an integer from zero to 3;
c is an integer from zero to 3;
d is an integer from zero to 3;
e is an integer from zero to 2;
the sum of (a+b+c+d+e) is not more than 4;
the sum of (a+b) is 1 to 4, preferably 1, 2 or 3;
the sum of (a+d) is 1 to 4;
the sum of (c+d) is zero to 4;
m is the number 1 or 2, preferably 1; and
M is a hydrogen atom or an alkali metal, such as sodium, potassium or lithium, or another salt-forming metal.

The formula members can have meanings which are identical to one another or different from one another.

The phthalocyanine dyestuffs according to the invention are as a rule obtained in the form of mixtures of the individual compounds of the general formula (1), these individual compounds differing from one another by the degree of substitution of the carboxy, sulfo, carboxamide and sulfonamide groups on the phthalocyanine radical, i.e. by the size of the indices a, b, c, d and e. The formulae of the phthalocyanine dyestuffs according to the invention therefore have indices which are as a rule fractions.

A sulfo group is a group of the general formula —SO$_3$M, where M has the abovementioned meaning; in the same manner, a carboxy group is a group of the general formula —COOM, a sulfato group is a group of the general formula —OSO$_3$M, a thiosulfato group is a group of the general formula —S—SO$_3$M and a phosphato group is a group of the general formula —O—PO$_3$M$_2$, in each case where M has the abovementioned meaning.

The phthalocyanine dyestuffs of the formula (1) according to the invention are in the form of their salts, such as the alkali metal salts, and are used as such for dyeing fiber materials.

The term "lower" used above and below means that the groups described by this term contain or are alkyl radicals or alkylene radicals having 1 to 6 carbon atoms, preferably 1 to 4 carbon atoms. The aliphatic radicals and the aryl radicals of the formula members R, R$^1$, R$^2$, R$^4$ and R$^5$ can contain substituents, as stated. In the case of the alkyl radicals, preferably lower alkyl groups, the substituents are preferably hydroxy, lower alkoxy, chlorine, sulfato, cyano, sulfo, carboxy, phenyl, sulfophenyl and carboxyphenyl, these alkyl radicals, if they are substituted, preferably containing 1 or 2 such substituents. Aryl radicals are preferably optionally substituted naphthyl radicals, such as sulfo-substituted naphthyl radicals, and in particular substituted phenyl radicals, preferably those having 1 or 2 substituents from the group comprising methyl, ethyl, methoxy, ethoxy, chlorine, carboxy and sulfo. Alkyl radicals are preferably the methyl or ethyl group, and alkoxy radicals are preferably the ethoxy, and in particular the methoxy group.

Preferred compounds of the general formula (1) are those in which e is the number zero or, in the case where e is greater than zero, R$^4$ and R$^5$ are both a hydrogen atom. Compounds which are furthermore preferred are those in which Pc is the copper phthalocyanine radical, and moreover those corresponding to the general formula (1) in which b, c and e are each zero.

Compounds of the general formula (1) which are furthermore preferred are those in which R$^1$, R$^2$ and R$^3$ or at least one of these are hydrogen, and moreover those in which A is the meta- or para-phenylene radical, which can be substituted by sulfo, methyl and/or methoxy, or is ethylene or n-propylene.

Radicals of the general formula (2) which are or can be contained in the compounds of the general formula (1) are, for example, 2-(β-sulfatoethylsulfonyl)-phenylamino, 3-(β-sulfatoethylsulfonyl)-phenyl-amino, 4-(β-sulfatoethylsulfonyl)-phenyl-amino, 2-carboxy-5-(β-sulfatoethylsulfonyl)-phenyl-amino, 2-chloro-3-(β-sulfatoethylsulfonyl)-phenyl-amino, 2-chloro-4-(β-sulfatoethylsulfonyl)-phenyl-amino, 2-ethoxy-4- or 5-(β-sulfatoethylsulfonyl)-phenyl-amino, 2-ethyl-4-(β-sulfatoethylsulfonyl)-phenyl-amino, 2-methoxy-5-(β-sulfatoethylsulfonyl)-phenyl-amino, 2,4-diethoxy-5-(β-sulfatoethylsulfonyl)-phenyl-amino, 2,4-dimethoxy-5-(β-sulfatoethylsulfonyl)-phenyl-amino, 2,5-dimethoxy-4-(β-sulfatoethylsulfonyl)-phenyl-amino, 2-methoxy-5-methyl-4-(β-sulfatoethylsulfonyl)-phenyl-amino, 2- or 3- or 4-(β-thiosulfatoethylsulfonyl)-phenyl-amino, 2-methoxy-5-(β-thiosulfatoethylsulfonyl)-phenyl-amino, 2-sulfo-4-(β-phosphatoethylsulfonyl)-phenyl-amino, 2-sulfo-4-vinylsulfonyl-phenyl-amino, 2-hydroxy-4- or -5-(β-sulfatoethylsulfonyl)-phenyl-amino, 2-chloro-4- or -5-(β-chloroethylsulfonyl)-phenyl-amino, 2-hydroxy-3-sulfo-5-(β-sulfatoethylsulfonyl)-phenyl-amino, 3- or 4-(β-acetoxyethylsulfonyl)-phenyl-amino, 2-methoxy-4-[β-(N-methyltauryl)-ethylsulfonyl]-phenyl-amino, 5-(β-sulfatoethylsulfonyl)-naphth-2-yl-amino, 6- or 7- or 8-(β-sulfatoethylsulfonyl)-naphth-2-yl-amino, 6-(β-sulfatoethylsulfonyl)-1-sulfo-naphth-2-yl-amino, 5-(β-sulfatoethylsulfonyl)-1-sulfo-naphth-2-yl-amino, 8-(β-sulfatoethyl-sulfonyl)-6-sulfo-naphth-2-yl-amino, β-[4-(β'-sulfatoethylsulfonyl)-phen]-ethylamino, β-[2-sulfo-4-(β'-sulfatoethylsulfonyl)-phen]-ethylamino, β-(β'-chloroethylsulfonyl)-ethylamino, β-(β'-sulfatoethylsulfonyl)-ethylamino, β-(vinylsulfonyl)-ethylamino, γ-(β'-chloroethylsulfonyl)-propylamino, γ-(β'-sulfatoethylsulfonyl)-propylamino, γ-(β'-bromoethylsulfonyl)-propylamino, γ-(vinylsulfonyl)-propylamino, 1-methyl-1-(β-sulfatoethylsulfonyl)-1-ethylamino, δ-(β'-sulfatoethylsulfonyl)-butylamino, 2-methyl-2-(β-chloroethylsulfonyl)-1-propylamino, Ω-(β'-chloroethylsulfonyl)-pentylamino, β-(β'-chloroethylsulfonyl)-n-hexylamino, N-methyl-N-[β-(β'-chloroethylsulfonyl)-ethyl]-amino, N-ethyl-N-[β(β'-chloroethylsulfonyl)-ethyl]-amino, N-n-propyl-N-[β-(β'-chloroethylsulfonyl)-ethyl]-amino, N-n-butyl-N-[β-(β'-chloroethylsulfonyl)-ethyl]-amino, N-n-pentyl-N-[β-(β'-chloroethylsulfonyl)-ethyl]-amino, N-n-hexyl-N-[β-(β'-chloroethylsulfonyl)-ethyl]-amino, N-carboxymethyl-N-[β-(β'-bromoethylsulfonyl)-ethyl]-amino, N-sulfatomethyl-N-[β-(β''-chloroethylsulfonyl)-ethyl]-amino, N-(β-carboxy-ethyl)-N-[γ'-chloroethylsulfonyl)-propyl]-amino, N-(β-sulfatoethyl)-N-[γ'-(β''-chloroethylsulfonyl)-propyl]-amino, N-(β-sulfatoethyl)-N-[δ'-(β''-chloroethylsulfonyl)butyl]-amino, N-(β-ethoxyethyl)-N-[δ'-(β''-chloroethylsulfonyl)-butyl]-amino, N-(γ-chloropropyl)-N-[β'-(β''-chloroethylsulfonyl)-ethyl]-amino, N-phenyl-N-[β-(β'-chloroethylsulfonyl)-ethyl]-amino, N-(4-chlorophenyl)-N-[β-(β'-chloroethylsulfonyl)-ethyl]-amino, N-(2-methylphenyl)-N-[β-(β'-chloroethylsulfonyl)-ethyl]-amino, N-(4-methoxyphenyl)-N-[β-(β'-chloroethylsulfonyl)-ethyl]-amino, N-(3-sulfophenyl)-N-[β-(β'-chloroethylsulfonyl)ethyl]-amino, N-(4-sulfophenyl)-N-[β-(β'-chloroethyl-sulfonyl)-ethyl]-amino, bis-[β-(β'-chloroethylsulfonyl)ethyl]-amino, bis-[β-(β'-bromoethylsulfonyl)-ethyl]-amino, bis-[γ-(β'-chloroethylsulfonyl)-propyl]-amino, bis-[δ-(β'-chloroethylsulfonyl)-butyl]- amino, bis-(β-vinylsulfonyl-ethyl)-amino, N-(β-cyanoethyl)-N-[γ'-(β''-chloroethylsulfonyl)-propyl]-amino, β-[β'-(β''-chloroethylsulfonyl)-ethylamino]-ethylamino, β-[β'-(β''-sulfatoethylsulfonyl)-ethylamino]-ethylamino, β-[β'-(β''-chloroethylsulfonyl)-ethoxy]-ethylamino, β-[β'-(β''-sulfatoethylsulfonyl)-ethoxy]-ethylamino, 4-[β-(β'-chloroethylsulfonyl)-ethyl]-piperazin-1-yl, 4-[γ-(β'-chloroethylsulfonyl)-propyl]-piperazin-1-yl, 4-[β-(β'-sulfatoethylsulfonyl)-ethyl]-piperazin-1-yl, 4-[β-(β'-sulfatoethylsulfonyl)-propyl]-piperazin-1-yl, 3,4-di-(β-sulfatoethylsulfonyl)-phenylamino, 2,5-di-(β-sulfatoethylsulfonyl)-phenylamino, 4-[γ-(β'-sulfatoethylsulfonyl)-propoxy]-phenylamino, 2,5-bis-[(β-sulfatoethylsulfonyl)-methyl]-phenylamino, 3- or 4-{N-[γ-(β'-sulfatoethylsulfonyl)-propyl-amidocarbonyl]}-phenylamino and 3,5-bis-{N-[γ-(β'-sulfatoethylsulfonyl)-propyl-amidocarbonyl]}-phenylamino.

Radicals G which can be contained in the compounds of the general formula (1) are, for example, 1,2-ethylene, 1,3-ethylene, 1,4-butylene, 1,6-hexylene, 1,3-phenylene, 1,4-phenylene, 4-chloro-1,3-phenylene, 4-methyl-1,3-phenylene, 4-methoxy-1,3-phenylene, 4-ethoxy-1,3-phenylene, 2-methyl-1,4-phenylene, 2-methoxy-1,4-phenylene, 2-ethoxy-1,4-phenylene, 2-chloro-1,4-phenylene, 2,5-dimethyl-1,4-phenylene, 2-methyl-5-methoxy-1,4-phenylene, 2,5-dimethoxy-1,4-phenylene, 2,5-diethoxy-1,4-phenylene, 2,4,6-trimethyl-1,3-phenylene, 2,3,5,6-tetramethyl-1,4-phenylene, 2-sulfo-1,4-phenylene, 2,5-disulfo-1,4-phenylene, 2,6-disulfo-1,4-phenylene, 4-sulfo-1,3-phenylene, 4,6-disulfo-1,3-phenylene,2-chloro-5-sulfo-1,4-phenylene,2-methyl-5-sulfo-1,4-phenylene,2-carboxy-1,4-phenylene,4-carboxy-1,3-phenylene and piperazin-1,4-ylene.

Radicals of the general formula $-NR^4R^5$ or $-NR^6R^7$ which can be contained in the compounds of the general formula (1) are, for example, methylamino, ethylamino, n-butylamino, benzylamino, phenylamino, β-hydroxy-ethylamino, dimethylamino, diethylamino, di-(isopropyl)-amino, N-methylbenzylamino, N-methyl-phenylamino, N-piperidino, N-morpholino, di-(β-hydroxyethyl)-amino, β-sulfo-ethylamino, β-carboxyethylamino, β-(4-carboxy-phenyl)-ethylamino, 3-sulfophenylamino, 4-sulfophenylamino, the primary amino group and the cyanamido radical.

The present invention furthermore relates to processes for the preparation of the phthalocyanine dyestuffs of the general formula (1), which comprise reacting a compound of the general formula (4), in which the individual formula radicals have the meanings given for formula (1), with a halogenotriazine compound of the general formula (5), in which Hal is halogen, such as chlorine and fluorine, and W, $R^3$, A, Y, Z and m have one of the abovementioned meanings, or reacting a compound of the general formula (6), in which the formula radicals have the meanings given for formula (1), with an amino compound of the general formula (7), in which $R^3$, A, Y and m have one of the abovementioned meanings and Z' has one of the meanings given for Z or is the β-hydroxyethylsulfonyl group, and, in the case where Z' is the β-hydroxyethylsulfonyl group, converting the resulting phthalocyanine compound containing the β-hydroxyethylsulfonyl group into a phthalocyanine dyestuff of the formula (1) containing a radical Z in a manner which is known per se, or, to prepare a copper phthalocyanine dyestuff of the formula (1), in which W is one of the amino groups given above for W, reacting a compound of the general formula (8), in which the individual formula radicals have the meanings given for formula (1) and Hal is chlorine or fluorine, with an amine of the general formula HNR$^6$R$^7$, where R$^6$ and R$^7$ have the above meaning, or an amine of the general formula (7).

Which of the two procedures for the preparation of the phthalocyanine dyestuffs of the formula (1) according to the invention is preferably employed or advantageously carried out depends above all on the solubility of the participating starting compounds containing amino groups, and the basicity thereof.

The reactions according to the invention can be carried out in an aqueous or aqueous-organic medium. If the medium is an aqueous-organic medium, the organic solvent portion is a water-miscible solvent which is inert towards the reactants and reaction conditions, such as, for example, dimethyl sulfoxide, acetone and an N-alkylacylamide, such as dimethylformamide. The reactions of the phthalocyanine compounds containing amino groups or of the amines with the halogenotriazine compounds are carried out by a procedure which is customary per se and under the customary process conditions, which are known for analogous conversion reactions between amines or cyanamide and a halogenotriazine (cf., for example, European Patent Application Publication No. 0,218,131A and U.S. Pat. Nos. 3,758,470 and 4,350,632). As a rule, the reaction between a compound of the general formula (4) and a halogenotriazine of the general formula (5) is carried out at a temperature between 40° and 90° C., preferably between 60° and 80° C., and at a pH of between 2 and 7, preferably between 3 and 5. The reaction between a compound of the general formula (6) and an amino compound of the general formula (7) is as a rule carried out at a temperature between 30° and 80° C., preferably between 60° and 70° C., and at a pH of between 3 and 7, preferably between 3 and 5. The compounds of the general formula (8) are as a rule reacted with the amino compounds of the formula HNR$^6$R$^7$ or of the general formula (7) at a temperature between 40° and 90° C., preferably between 70° and 85° C., and at a pH of between 2.5 and 6, preferably between 3 and 5.

The starting compounds of the general formula (4) are prepared in a manner which is known per se for reaction of phthalocyanine acid chlorides with amino compounds, thus by reaction of a phthalocyanine acid chloride of the general formula (9) in which
  Pc and M have the abovementioned meanings,
  p is an integer from 1 to 4,
  q is an integer from zero to 3,
  r is an integer from zero to 3 and
  s is an integer from zero to 3,
  in which the sum of (p+q+r+s) is an integer from 1 to 4, the sum of (p+q) is a number from 1 to 4 and the sum of (r+s) is a number from zero to 3,
or a mixture of these compounds of the general formula (9), in an aqueous or aqueous-organic medium, with an amine of the general formula (10), in which R$^1$, R$^2$ and G have the abovementioned meanings, and if appropriate with a further amine of the general formula (11), where R$^4$ and R$^5$ have the abovementioned meanings, simultaneously or in any desired sequence.

In the reaction of the phthalocyanine acid chloride of the general formula (9) with an amino compound of the general formula (10) or the amines of the general formula (10) and (11), partial hydrolysis of the carboxylic acid chloride groups and of any sulfonic acid chloride groups present can take place simultaneously during these condensation reactions. As a rule, partial hydrolysis of these acid chloride groups into carboxy and sulfo groups is unavoidable.

The starting compounds of the general formula (6) or (8) are likewise obtained by procedures analogous to known procedures for reaction of amino compounds or cyanamide with halogenotriazine compounds or a cyanuric halide (1,3,5-halogeno-s-triazine), thus by reaction of a compound of the general formula (10) with a cyanuric halide, such as cyanuric chloride or cyanuric fluoride, or a dihalogeno-s-triazine of the general formula (12), in which Hal and W have the abovementioned meanings, and an amine of the general formula (7) or cyanamide in any desired sequence, the sequence of the various reactions depending on the solubility of the amino compounds participating or on the cyanamide and the basicity thereof to the halogenotriazines. The expert is familiar with the choice of these process steps. Such procedures are known, for example, from the abovementioned literature and European Patent Application Publication No. 0,073,267A.

If a starting amine of the formula (5) in which Z' is the β-hydroxyethylsulfonyl group is used as the starting substance in the process according to the invention for the preparation of the phthalocyanine compounds of the general formula (1), the resulting phthalocyanine compound, which corresponds to the general formula (1) in which, however, Z here is the β-hydroxy-ethylsulfonyl group, is converted into a phthalocyanine compound according to the invention, which contains an ester group, such as, for example, the sulfato group, in the β-position of the ethylsulfonyl radical. This esterification reaction is carried out by procedures analogous to known procedures, using the customary esterifying and acylating agents for such acids, such as, for example, acetic anhydride, polyphosphoric acid, phosphorus pentachloride and, in particular, 96–100% strength sulfuric acid or sulfuric acid containing sulfur trioxide, such as oleum having a sulfur trioxide content of up to 35%, or chlorosulfonic acid, for introduction of the sulfato group. The reaction with sulfuric acid or sulfuric acid containing sulfur trioxide is carried out at a temperature between 0° C. and 25° C. The reaction with chlorosulfonic acid can also be carried out in a polar organic solvent, such as, for example, N-methylpyrrolidone, at 10° to 80° C.

Phthalocyanine dyestuffs of the general formula (1) can be converted by a customary and known procedure into phthalocyanine dyestuffs of the general formula (1) having a different substituent which can be eliminated under alkaline conditions in the fiber-reactive radical Z. Such procedures are described in numerous instances in the literature relating to fiber-reactive dyestuffs containing a fiber-reactive radical of the vinyl sulfone series. Phthalocyanine dyestuffs containing the β-sulfatoethylsulfonyl radical can thus be converted into the phthalocyanine dyestuffs having the vinylsulfonyl group for the radical Z by treatment with an alkali, such as in aqueous sodium hydroxide solution at a temperature of 0° to 40° C. in the course of a few minutes. Phthalocyanine dyestuffs according to the invention containing the β-thiosulfatoethylsulfonyl radical can be obtained, for example, from phthalocyanine dyestuffs containing the vinylsulfonyl group by reaction with sodium thiosulfate.

The condensation reactions according to the invention between the compounds of the general formula (9) and the amines of the general formula (10) and (11) are carried out, for example, by a procedure analogous to the procedures of German Offenlegungsschriften Nos. 28 42 640 and 34 05 204 at a pH of between 3.5 and 8.5, preferably between 5 and 8, and at a temperature between 0° C. and 100° C., preferably between 40° and 60° C.

Phthalocyaninesulfonic acid chlorides and phthalocyaninecarboxylic acid chlorides have been known in the literature for a long time. The preparation of phthalocyaninesulfonic acid chlorides can be seen, for example, from information in the abovementioned U.S. Patents and from German Patent No. 891,121. Phthalocyaninecarboxylic acid chlorides can be prepared analogously to the information in U.S. Pat. No. 3,301,814, one or more of the starting compounds being substituted by carboxylic acid groups. The carboxy substituted phthalocyanines thus obtained are converted into their carboxylic acid chloride compounds by well-known procedures for conversion of carboxy groups into carboxylic acid chloride groups. Phthalocyanine compounds which contain both carboxylic acid chloride and sulfochloride groups can be obtained by sulfochlorination of the phthalocyaninecarboxylic acid or -carboxylic acid chloride compounds.

Phthalocyanine starting compounds of the general formula (9) are, for example, the carboxylic acid chlorides, which optionally contain sulfo and/or sulfonyl groups, and the carboxylic acid chlorides, which contain carboxy groups, of metal-free phthalocyanine and, preferably, of copper phthalocyanine, cobalt phthalocyanine and nickel phthalocyanine, such as, for example, the mono-, di-, tri- and tetracarboxylic acid chloride of copper phthalocyanine, of cobalt phthalocyanine and of nickel phthalocyanine, thus, for example, copper phthalocyanine-(3)-monocarboxylic acid chloride, copper phthalocyanine-(3)-dicarboxylic acid chloride, copper phthalocyanine-(3)-tricarboxylic acid chloride, copper phthalocyanine-(3)-tetracarboxylic acid chloride, nickel phthalocyanine-(3)-tetracarboxylic acid chloride, cobalt phthalocyanine-(3)-monocarboxylic acid chloride, cobalt phthalocyanine-(3)-di- and -tricarboxylic acid chloride, copper phthalocyanine-(4)-mono- and -dicarboxylic acid chloride, copper phthalocyanine-(4)-tri- and -tetracarboxylic acid chloride, copper phthalocyanine-(3)-monocarboxylic acid chloride-disulfonic acid chloride, copper phthalocyanine-(3)-dicarboxylic acid chloride-monosulfonic acid chloride, copper phthalocyanine-(3)-monocarboxylic acid chloride-monocarboxylic acid, copper phthalocyanine-(3)-dicarboxylic acid chloride-monocarboxylic acid and copper phthalocyanine-(3)-dicarboxylic acid chloride-disulfonic acid chloride, and furthermore the acid chlorides of this type which additionally contain other substituents on the phthalocyanine nucleus, such as phenyl radicals and halogen atoms, such as, for example, the carboxylic acid chlorides or mixed carboxylic acid/sulfonic acid chlorides of tetraphenyl-copper phthalocyanine or tetrachloronickel phthalocyanine.

Acid-binding agents which are used in the process according to the invention for the preparation of the phthalocyanine dyestuffs of the general formula (1) are, for example, the hydroxides, carbonates, bicarbonates, secondary phosphates, tertiary phosphates, borates and acetates of metals of groups 1 to 3 of the Periodic Table, preferably of the alkali metals, such as of sodium, potassium and lithium, and of the alkaline earth metals, such as those of calcium.

The process according to the invention for the preparation of the compounds (1) is preferably carried out in an aqueous medium. To improve the solubility of the starting substances or end products in the aqueous reaction medium, an organic solvent, preferably an amide of an aliphatic carboxylic acid, such as dimethylformamide or N-methyl-pyrrolidone, can be added if appropriate.

The phthalocyanine dyestuffs of the general formula (1) prepared according to the invention, called "dyestuffs (1)" below, are separated out of the synthesis batches by generally known methods, either by precipitation from the reaction medium by means of electrolytes, such as, for example, sodium chloride or potassium chloride, or by evaporation of the reaction solution, for example by spray drying, it being possible for a buffer substance to be added to this reaction solution. They have fiber-reactive properties and have very good dyestuff properties. They can therefore be used for dyeing and printing material containing hydroxyl and-/or carboxamide groups, in particular fiber material, and also leather. The solutions obtained during synthesis of the compounds according to the invention can also be put to use for dyeing directly as a liquid preparation, if appropriate after addition of a buffer substance and if appropriate after concentration.

The present invention therefore also relates to the use of the dyestuffs (1) for dyeing (including printing) materials containing hydroxy groups and materials containing carboxamide groups, and to processes for their use on these substrates. The materials are preferably used in the form of fiber materials, in particular in the form of textile fibers, such as yarns, wound packages and woven fabrics.

Materials containing hydroxy groups are natural or synthetic materials containing hydroxy groups, such as, for example, cellulose fiber materials, also in the form of paper, or regenerated products thereof, and polyvinyl alcohols. Cellulose fiber materials are preferably cotton, but also other plant fibers, such as linen, hemp, jute and ramie fibers; regenerated cellulose fibers are, for example, staple viscose and viscose rayon.

Materials containing carboxamide groups are, for example, synthetic and natural polyamides and polyurethanes, in particular in the form of fibers, for example wool and other animal hair, silk, leather, polyamide 6,6, polyamide 6, polyamide 11 and polyamide 4.

The dyestuffs (1) can be applied to and fixed on the substrates mentioned, in particular the fiber materials mentioned, by the use techniques known for water-soluble dyestuffs, in particular for fiber-reactive dyestuffs. Dyeings in very good color yields and with an excellent color build-up are thus obtained with them on cellulose fibers by the exhaustion process from a long liquor using the most diverse acid-binding agents and if appropriate neutral salts, such as sodium chloride or sodium sulfate. Dyeing is carried out at temperatures between 40° and 105° C., if appropriate at temperatures up to 130° C., under pressure, if appropriate in the presence of customary dyeing auxiliaries, and in an aqueous bath. A procedure can be followed here in which the material is introduced into the warm bath and this is gradually heated up to the desired dyeing temperature, and the dyeing process is brought to completion at this temperature. If desired, the neutral salts, which accelerate exhaustion of the dyestuff, can also be added to the bath only after the actual dyeing temperature has been reached.

Dyeings with excellent color yields and a very good color build-up are likewise obtained on cellulose fibers by the padding processes, it being possible for the dyeings to be fixed in the customary manner by batching at room temperature or elevated temperature, for example up to about 60° C., by steaming or with dry heat.

Deep-colored prints having a good sharpness of contors and a clear white background are likewise obtained by the customary printing processes for cellulose fibers—which can be carried out either in one phase, for example by printing with a printing paste comprising sodium bicarbonate or another acid-binding agent and the coloring agent and by subsequent steaming at 100° to 103° C., or in two phases, for example by printing with a neutral or weakly acid printing paste which comprises the coloring agent and subsequent fixing, either by passing the printed goods through a hot alkaline bath containing electrolyte or by overpadding with an alkaline padding liquor containing electrolyte and subsequent batching of this treated material or subsequent steaming or subsequent treatment with dry heat. The print result depends only little on the varying fixing conditions. The degrees of fixing obtained with the compounds according to the invention are very high both in dyeing and in printing. Hot air at 120° to 200° C. is used for fixing by means of dry heat by the customary thermofixing processes. In addition to the customary steam at 101° to 103° C., superheated steam and pressurized steam having temperatures of up to 160° C. can also be employed.

The agents which effect binding of the acids and fixing of the dyestuffs to the cellulose fibers are, for example, water-soluble basic salts of alkali metals and of alkaline earth metals with inorganic or organic acids, and also compounds which liberate an alkali under the effect of heat.

The alkali metal hydroxides and alkali metal salts of weak to moderately strong inorganic or organic acids are to be mentioned in particular, and of the alkali metal compounds, the sodium and potassium compounds are preferably meant. Such acid-binding agents are, for example, sodium hydroxide, potassium hydroxide, sodium carbonate, sodium bicarbonate, potassium carbonate, sodium formate, sodium dihydrogen phosphate and disodium hydrogen phosphate.

By treatment of the dyestuffs (1) with the acid-binding agents, if appropriate under the effect of heat, the dyestuffs are bonded chemically to the cellulose fiber; the cellulose dyeings in particular show excellent wet-fastnesses after customary after-treatment by rinsing to remove non-fixed dyestuff portions, especially since non-fixed dyestuff portions can easily be washed out because of their good solubility in cold water.

Dyeings on polyurethane fibers and polyamide fibers are usually carried out from an acid medium. Thus, for example, acetic acid and/or ammonium sulfate and/or acetic acid and ammonium acetate or sodium acetate can be added to the dyebath to obtain the desired pH. To achieve a usable levelness of the dyeing, addition of customary leveling agents, such as, for example, those based on a reaction product of cyanuric chloride with three times the amount of an aminobenzenesulfonic acid or aminonaphthalenesulfonic acid or based on a reaction product of, for example, stearylamine with ethylene oxide, is advisable. As a rule, the material to be dyed is introduced into the bath at a temperature of about 40° C. and is agitated therein for some time, the dyebath is then adjusted to the desired weakly acid, preferably weakly acetic acid, pH and the actual dyeing is carried out at a temperature between 60° and 98° C. However, the dyeings can also be carried out at the boiling point or at temperatures up to 120° C. (under pressure).

The dyeings and prints produced with the compounds (1) according to the invention on cellulose fiber materials have a good depth of color, and moreover good light-fastnesses and good wet-fastnesses, such as fastness to washing, milling, water, sea-water, cross-dyeing and perspiration, and moreover a good fastness to pleating, fastness to ironing and fastness to rubbing. Their alkaline perspiration light-fastness and the good wet light-fastness of dyeings wetted with drinking water are to be singled out in particular.

The following Examples serve to illustrate the invention. The compounds described by their formulae are shown in the form of the free acid; in general, they are prepared and isolated in the form of their alkali metal salts, and used for dyeing in the form of their salts. The starting compounds mentioned in the following Examples, in particular the Tabular Examples, in the form of the free acid can likewise be employed in the synthesis as such or in the form of their salts, preferably alkali metal salts, such as sodium salts or potassium salts.

The parts mentioned in the Examples are parts by weight, and the percentage data are percentages by weight, unless noted otherwise. Parts by weight bear the same ratio to parts by volume as the kilogram to the liter. The formula radical CuPc is the copper phthalocyanine radical, and the formula radical NiPc is the nickel phthalocyanine radical.

The absorption maxima ($\lambda_{max}$) in the visible range stated for the compounds according to the invention were determined with the aid of their alkali metal salts in aqueous solution. In the Tabular Examples, the $\lambda_{max}$ values are placed in parentheses alongside the color shade data; the wavelength data are in nm.

EXAMPLE A 299 parts of phthalic anhydride are ground with 131 parts of benzenetricarboxylic anhydride, 78 parts of ammonium chloride, 952 parts of urea, 12 parts of ammonium molybdate and 200 parts of copper sulfate. The mixture is introduced into 800 parts of nitrobenzene, and the reaction is carried out at a temperature between 160° and 190° C. for several hours. When the reaction has ended, the product which has precipitated is filtered off, washed with ethanol, subsequently introduced into a 20% strength aqueous sodium hydroxide solution, stirred therein and filtered off again with suction, washed with a little water and dried. For recrystallization of the resulting copper phthalocyanine-monocarboxylic acid, the compound is dissolved in concentrated sulfuric acid, this solution is stirred slowly into ice and the copper phthalocyanine-monocarboxylic acid which has precipitated is filtered off.

EXAMPLE B 63.8 parts of copper phthalocyanine-monocarboxylic acid are introduced into 100 parts of chlorosulfonic acid, and the two reactants are reacted with one another at a temperature between 120° and 130° C. for about four hours. 44 parts of thionyl chloride are then added, and the reaction is carried out at 60° to 90° C. for about four hours. The reaction batch is then poured onto ice and the residue is filtered off. A copper phthalocyanine-monocarboxylic acid chloride which contains chlorosulfonyl groups and has on average 2.1 sulfonyl chloride groups per molecule is obtained.

EXAMPLE C 78 parts of copper phthalocyanine-monocarboxylic acid are added to 200 parts of chlorosulfonic acid, and the batch is heated at a temperature between 140° and 150° C. for about four hours. 100 parts of thionyl chloride are then added and the reaction is carried out at 70° to 90° C. for about four hours. When the reaction has ended, the batch is poured onto ice and the residue is filtered off. A copper phthalocyanine-monocarboxylic acid chloride which contains chlorosulfonyl groups and has on average two sulfonyl chloride groups per molecule is obtained.

EXAMPLE D 350 parts of copper phthalocyanine-monocarboxylic acid are introduced into 1000 parts of chlorosulfonic acid, the batch is heated at a temperature between 153° and 156° C. for about four hours, 430 parts of thionyl chloride are then added, the batch is kept at 60° to 90° C. for about four hours, and when this reaction has ended, the resulting reaction solution is poured onto ice and the residue is filtered off. A copper phthalocyanine-monocarboxylic acid chloride which contains chlorosulfonyl groups and has on average 2.5 sulfonyl chloride groups per molecule is obtained.

EXAMPLE E

To prepare nickel phthalocyanine-monocarboxylic acid, 299 parts of phthalic anhydride are ground with 131 parts of benzenetricarboxylic anhydride, 78 parts of ammonium chloride, 952 parts of urea, 12 parts of ammonium molybdate and 180 parts of nickel sulfate. The mixture is introduced into 800 parts of nitrobenzene, and the reaction is carried out at a temperature between 160° and 190° C. for several hours. When the reaction has ended, the product which has precipitated is filtered off, washed with ethanol, subsequently introduced into a 20% strength aqueous sodium hydroxide solution, stirred therein and filtered off again with suction, washed with some water and dried. For recrystallization of the resulting nickel phthalocyanine-monocarboxylic acid, the compound is dissolved in concentrated sulfuric acid, this solution is stirred slowly into ice, and the nickel phthalocyanine-monocarboxylic acid which has precipitated is filtered off.

EXAMPLE F 350 parts of nickel phthalocyanine-monocarboxylic acid are introduced into 1000 parts of chlorosulfonic acid, the batch is heated at a temperature between 153° and 156° C. for about four hours, 430 parts of thionyl chloride are then added, the batch is kept at 60° to 90° C. for about four hours, and when this reaction has ended, the resulting reaction solution is poured onto ice and the residue is filtered off. A nickel phthalocyanine-monocarboxylic acid chloride which contains chlorosulfonyl groups and has on average 2.5 sulfonyl chloride groups per molecule is obtained.

EXAMPLE 1

A mixture of 156 parts of chlorosulfonyl-copper phthalocyanine-monocarboxylic acid chloride (having on average 2.5 sulfonyl chloride groups per molecule, from Example D), 75 parts of 3-amino-acetanilide and 1000 parts of water are stirred at a temperature of 40° to 70° C. for 10 to 15 hours, while maintaining a pH of 5 to 7. Thereafter, 357 parts of concentrated sulfuric acid are added and the batch is subsequently stirred at 80° to 90° C. for a further 3 to 5 hours. 95 parts of cyanuric chloride are then added to this reaction solution, and the reaction is carried out at a temperature of 0° to 10° C. and a pH of 4 to 6. For the further condensation reaction, 145 parts of 4-(β-sulfatoethylsulfonyl)-aniline are added, and this last condensation reaction is carried out at a pH of 3 to 6 and a temperature of 0° to 40° C.

The phthalocyanine dyestuff according to the invention is isolated from the resulting clear blue-green solution by the customary route by evaporation of the solution or by salting out with an electrolyte salt. An electrolyte-containing dyestuff powder comprising a dyestuff according to the invention, the chemical structure of which can be represented by formula (20), written in the form of the free acid (for the formula, cf. the sheets of formulae after the last Example), is obtained. It has an absorption maximum in the visible range at 663 nm.

The phthalocyanine dyestuff according to the invention has very good fiber-reactive dyestuff properties and produces deep-colored dyeings and prints, which have a green to turquoise blue shade and good fastness properties, on the materials mentioned in the description, such as, in particular, cellulose fiber materials (cotton), by the application and fixing processes customary in the art for fiber-reactive dyestuffs.

EXAMPLE 2

To prepare a copper phthalocyanine compound according to the invention, the procedure followed is as according to the procedure of Example 1, but in the last reaction stage, instead of the 4-(β-sulfatoethylsulfonyl)-aniline, the same amount of 3-(β-sulfatoethylsulfonyl)-aniline is employed.

This copper phthalocyanine dyestuff according to the invention also has very good fiber-reactive dyeing properties, which are practically the same as those of the dyestuff of Example 1. It has an absorption maximum in the visible range at 663 nm and, in the same manner as the dyestuff of Example 1, produces deep-colored green to turquoise blue dyeings having good fastness properties.

EXAMPLE 3

To prepare a copper phthalocyanine compound according to the invention, chlorosulfonyl-copper phthalocyanine-monocarboxylic acid chloride is first reacted with 3-amino-acetanilide in accordance with the information in Example 1, and the acetylamino group is hydrolyzed with sulfuric acid, as described in Example 1.

The monochlorotriazine starting compound is prepared in a separate batch by reacting 95 parts of cyanuric chloride with 21 parts of cyanamide at 0° to 10° C. and at a pH of 8 to 9, and then adding 145 parts of 4-(β-sulfatoethylsulfonyl)-aniline to this solution; the second condensation reaction is carried out at 0° to 40° C. and at a pH of 3 to 4.

The two reaction solutions are combined; the third condensation reaction is carried out at a pH of 3 to 4 and a temperature of 40' to 90° C. for about 8 hours.

The phthalocyanine dyestuff according to the invention which can be represented, written in the form of the free acid, by the formula (21) (for the formula, cf. the formulae sheets after the last Example) is isolated from the resulting blue-green solution in the customary manner by evaporation or by salting out with an electrolyte salt. The dyestuff according to the invention has an absorption maximum in the visible range at 663 nm; it exhibits very good fiber-reactive dyestuff properties and dyes, for example, cotton in deep-colored green to turquoise blue shades which have good fastness properties by the application and fixing processes customary in the art for fiber-reactive dyestuffs.

EXAMPLE 4

To prepare a copper phthalocyanine dyestuff according to the invention, the procedure followed is as according to the procedure of Example 3, but instead of 4-(β-sulfatoethylsulfonyl)-aniline, the same amount of 3-(β-sulfatoethylsulfonyl)-aniline is employed in the preparation of the chlorotriazine starting compound.

The copper phthalocyanine dyestuff according to the invention thus obtained, which is isomeric to the dyestuff of Example 3 in this amino component, has an absorption maximum in the visible range at 663 nm, and dyes the materials mentioned in the description, such as, in particular, cellulose fiber materials, in green to turquoise blue shades with good fastness properties by the dyeing processes customary for fiber-reactive dyestuffs.

EXAMPLE 5

A mixture of 156 parts of chlorosulfonyl-copper phthalocyanine-monocarboxylic acid chloride (having on average 2.5 sulfonyl chloride groups per molecule, from Example D), 94 parts of 1,3-diaminobenzene-6-sulfonic acid and 1000 parts of water is stirred at 40' to 50° C. for 10 to 15 hours, while maintaining a pH of 5 to 7. The reaction solution is then cooled, 95 parts of cyanuric chloride are added, and the reaction is carried out at 0° to 10° C. and at a pH of 4 to 6. After addition of 145 parts of 4-(β-sulfatoethylsulfonyl)-aniline, the third condensation reaction is carried out at a temperature of 0° to 40° C. and at a pH of 3 to 4 for about four hours.

The phthalocyanine dyestuff according to the invention, the structure of which can be represented by the general formula (22) (for the formula, cf. the formulae sheets after the last Example), is isolated from the clear blue-green solution in the customary manner by evaporation under reduced pressure, by spray drying or by salting out with an electrolyte, such as sodium chloride.

The copper phthalocyanine dyestuff according to the invention has an absorption maximum in the visible range at 663 nm. It shows very good fiber-reactive dyestuff properties and produces deep-colored green to turquoise blue dyeings and prints having good fastness properties.

EXAMPLE 6 TO 87

Further phthalocyanine compounds according to the invention corresponding to the general formula (A) (for the formula, cf. the formulae sheets after the last Example) are described with the aid of their formula components in the following Tabular Examples. They can be prepared in the manner according to the invention, for example in accordance with one of the above Examples, by means of their components which can be seen from the particular Tabular Example in association with formula (A) (thus a copper phthalocyanine-mono- or -dicarboxylic acid chloride containing sulfonyl groups optionally sulfo groups, cyanuric chloride or a 2,4-dichloro-s-triazine substituted in the 6-position, an amino compound corresponding to the general formula (2) given in the description and an optionally substituted diaminobenzene compound). They have fiber-reactive dyestuff properties and, in particular, produce deep-colored fast dyeings and prints on cellulose fiber materials in the color shade shown for dyeings on cotton in the particular Tabular Example by the application and fixing methods customary for fiber-reactive dyestuffs.

| Example | Radical R⁴ | W | R | A | (C + D) | Color shade |
|---|---|---|---|---|---|---|
| 6 | β-[β'-(β''-Chloroethylsulfonyl)-ethoxy]-ethylamino | Chlorine | H | 1.3 | 2.1 | green (670) |
| 7 | 2-(β-Sulfatoethylsulfonyl)-phenylamino | Chlorine | H | 1.1 | 2.4 | green (663) |
| 8 | 2-Methoxy-5-(β-sulfatoethylsulfonyl)-phenylamino | Chlorine | H | 1.1 | 2.4 | green (661) |
| 9 | 2-Methoxy-4-(β-sulfatoethylsulfonyl)-phenylamino | Chlorine | H | 1.2 | 2.2 | green (661) |
| 10 | N-Ethyl-4-(β-sulfatoethylsulfonyl)-phenylamino | Chlorine | H | 1.1 | 2.4 | green (662) |
| 11 | N-Ethyl-3-(β-sulfatoethylsulfonyl)-phenylamino | Chlorine | H | 1.1 | 2.4 | green (662) |
| 12 | 2-Sulfo-5-(β-sulfatoethylsulfonyl)-phenylamino | Chlorine | H | 1.3 | 2.2 | green (664) |
| 13 | 2-Carboxy-5-(β-sulfatoethylsulfonyl)-phenylamino | Chlorine | H | 1.1 | 2.4 | green (664) |
| 14 | 2-Hydroxy-5-(β-sulfatoethylsulfonyl)-phenylamino | Chlorine | H | 1.1 | 2.4 | green (663) |
| 15 | 2-Hydroxy-4-(β-sulfatoethylsulfonyl)-phenylamino | Chlorine | H | 1.1 | 2.4 | green (663) |
| 16 | 3-(β-Sulfatoethylsulfonyl)-propylamino | Chlorine | H | 1.1 | 2.4 | green (661) |
| 17 | 3-(β-Chloroethylsulfonyl)-propylamino | Chlorine | H | 1.1 | 2.4 | green (661) |
| 18 | β-[4-(β'-Sulfatoethylsulfonyl)-phenyl]-ethylamino | Chlorine | H | 1.1 | 2.4 | green (661) |
| 19 | β-[3-Sulfo-4-(β'-sulfatoethylsulfonyl)-phenyl]-ethylamino | Chlorine | H | 1.3 | 2.2 | green (663) |
| 20 | Bis-[β-(β'-chloroethylsulfonyl)-ethyl]-amino | Chlorine | H | 1.1 | 2.4 | green (661) |
| 21 | 3,4-Di-(β-sulfatoethylsulfonyl)-phenylamino | Chlorine | H | 1.1 | 2.4 | green (663) |
| 22 | 2,5-Di-(β-sulfatoethylsulfonyl)-phenylamino | Chlorine | H | 1.1 | 2.4 | green (673) |
| 23 | β-(β'-Sulfatoethylsulfonyl)-ethylamino | Chlorine | H | 1.1 | 2.4 | green (670) |
| 24 | β-[β'-(β''-Chloroethylsulfonyl)-ethoxy]-ethylamino | N-Ethyl-β-sulfoethylamino | Sulfo | 1.3 | 2.1 | green (670) |
| 25 | 4-(β-Sulfatoethylsulfonyl)-phenylamino | Methoxy | H | 1.1 | 2.4 | green (672) |
| 26 | 3-(β-Sulfatoethylsulfonyl)-phenylamino | Methoxy | H | 1.1 | 2.4 | green (672) |
| 27 | N-Ethyl-4-(β-sulfatoethylsulfonyl)-phenylamino | Cyanamido | H | 1.1 | 2.4 | green (671) |
| 28 | N-Ethyl-3-(β-sulfatoethylsulfonyl)-phenylamino | Cyanamido | H | 1.1 | 2.4 | green (671) |
| 29 | 2-Sulfo-5-(β-sulfatoethylsulfonyl)-phenylamino | Cyanamido | H | 1.3 | 2.4 | green (671) |
| 30 | 3-(β-Sulfatoethylsulfonyl)-propylamino | Cyanamido | H | 1.1 | 2.4 | green (670) |
| 31 | 3-(β-Chloroethylsulfonyl)-propylamino | Cyanamido | H | 1.1 | 2.4 | green (670) |
| 32 | β-(β'-Sulfatoethylsulfonyl)-ethylamino | Cyanamido | H | 1.1 | 2.4 | green (670) |
| 33 | β-(β'-Chloroethylsulfonyl)-ethylamino | Chlorine | H | 1.1 | 2.4 | green (670) |
| 34 | " | Cyanamido | H | 1.1 | 2.4 | green (670) |
| 35 | β-[β'-(β''-Sulfatoethylsulfonyl)-ethoxy]-ethylamino | Cyanamido | H | 1.1 | 2.4 | green (671) |
| 36 | β-[β'-(β''-Chloroethylsulfonyl)-ethoxy]-ethylamino | N-Ethyl-sulfoethylamino | Sulfo | 1.3 | 2.1 | green (670) |
| 37 | β-(β'-Sulfatoethylsulfonyl)-ethylamino | N-Ethyl-β-sulfoethylamino | Sulfo | 1.3 | 2.1 | green (670) |
| 38 | 4-(β-Sulfatoethylsulfonyl)-phenylamino | N-Ethyl-β-sulfoethylamino | H | 1.1 | 2.4 | green (671) |
| 39 | 3-(β-Sulfatoethylsulfonyl)-phenylamino | N-Ethyl-β-sulfoethylamino | H | 1.1 | 2.4 | green (672) |
| 40 | N-Ethyl-4-(β-sulfatoethylsulfonyl)-phenylamino | N-Ethyl-β-sulfoethylamino | H | 1.1 | 2.4 | green (671) |
| 41 | N-Ethyl-3-(β-sulfatoethylsulfonyl)-phenylamino | N-Ethyl-β-sulfoethylamino | H | 1.1 | 2.4 | green (671) |
| 42 | 2-Sulfo-4-(β-sulfatoethylsulfonyl)-phenylamino | N-Ethyl-β-sulfoethylamino | H | 1.3 | 2.4 | green (673) |
| 43 | 3-(β-Sulfatoethylsulfonyl)-propylamino | N-Ethyl-β-sulfoethylamino | H | 1.1 | 2.4 | green (670) |
| 44 | 3-(β-Chloroethylsulfonyl)-propylamino | N-Ethyl-β-sulfoethylamino | H | 1.1 | 2.4 | green (670) |
| 45 | β-(β'-Sulfatoethylsulfonyl)-ethylamino | N-Ethyl-β-sulfoethylamino | H | 1.1 | 2.4 | green (670) |
| 46 | β-(β'-Chloroethylsulfonyl)-ethylamino | N-Ethyl-β-sulfoethylamino | H | 1.1 | 2.4 | green (670) |
| 47 | β-[β'-(β''-Sulfatoethylsulfonyl)-ethoxy]-ethylamino | N-Ethyl-β-sulfoethylamino | H | 1.1 | 2.4 | green (670) |
| 48 | β-(β'-Chloroethylsulfonyl)-ethylamino | N-Ethyl-β-sulfoethylamino | Sulfo | 1.3 | 2.1 | green (670) |
| 49 | β-[β'-(β''-Chloroethylsulfonyl)-ethoxy]-ethylamino | N-Ethyl-β-sulfoethylamino | H | 1.1 | 2.4 | green (670) |

-continued

| Example | Radical R⁴ | W | R | A | (C + D) | Color shade |
|---|---|---|---|---|---|---|
| 50 | 3-(β-Chloroethylsulfonyl)-propylamino | N-Ethyl-β-sulfoethylamino | H | 1.3 | 2.1 | green (670) |
| 51 | 2-(β-Sulfatoethylsulfonyl)-phenylamino | Chlorine | Sulfo | 1.3 | 2.1 | green (672) |
| 52 | 2-Methoxy-5-(β-sulfatoethylsulfonyl)-phenylamino | Chlorine | Sulfo | 1.3 | 2.1 | green (671) |
| 53 | 2-Methoxy-4-(β-sulfatoethylsulfonyl)-phenylamino | Chlorine | Sulfo | 1.3 | 2.1 | green (671) |
| 54 | N-Ethyl-4-(β-sulfatoethylsulfonyl)-phenylamino | Chlorine | Sulfo | 1.3 | 2.1 | green (671) |
| 55 | N-Ethyl-3-(β-sulfatoethylsulfonyl)-phenylamino | Chlorine | Sulfo | 1.3 | 2.1 | green (671) |
| 56 | 2-Sulfo-5-(β-sulfatoethylsulfonyl)-phenylamino | Chlorine | Sulfo | 1.3 | 2.1 | green (673) |
| 57 | 2-Carboxy-4-(β-sulfatoethylsulfonyl)-phenylamino | Chlorine | Sulfo | 1.3 | 2.1 | green (673) |
| 58 | 2-Carboxy-4-(β-sulfatoethylsulfonyl)-phenylamino | Chlorine | Sulfo | 1.3 | 2.1 | green (672) |
| 59 | 2-Carboxy-5-(β-sulfatoethylsulfonyl)-phenylamino | Chlorine | Sulfo | 1.3 | 2.1 | green (672) |
| 60 | 3-(β-Sulfatoethylsulfonyl)-propylamino | Chlorine | Sulfo | 1.3 | 2.1 | green (670) |
| 61 | 3-(β-Chloroethylsulfonyl)-propylamino | Chlorine | Sulfo | 1.3 | 2.1 | green (670) |
| 62 | β-[4-(β'-Sulfatoethylsulfonyl)-phenyl]-ethylamino | Chlorine | Sulfo | 1.3 | 2.1 | green (670) |
| 63 | β-[2-Sulfo-5-(β'-sulfatoethylsulfonyl)-phenyl]-ethylamino | Chlorine | Sulfo | 1.3 | 2.1 | green (673) |
| 64 | Bis-[β-(β'-chloroethylsulfonyl)-ethyl]-amino | Chlorine | Sulfo | 1.3 | 2.1 | green (670) |
| 65 | 3,4-Di-(β-sulfatoethylsulfonyl)-phenylamino | Chlorine | Sulfo | 1.3 | 2.1 | green (670) |
| 66 | 2,5-Di-(β-sulfatoethylsulfonyl)-phenylamino | Chlorine | Sulfo | 1.3 | 2.1 | green (673) |
| 67 | β-(β'-Sulfatoethylsulfonyl)-ethylamino | Chlorine | Sulfo | 1.3 | 2.1 | green (670) |
| 68 | 3-(β-Sulfatoethylsulfonyl)-propylamino | N-Ethyl-β-sulfoethylamino | Sulfo | 1.3 | 2.1 | green (670) |
| 69 | 4-(β-Sulfatoethylsulfonyl)-phenylamino | Cyanamido | Sulfo | 1.3 | 2.1 | green (672) |
| 70 | 3-(β-Sulfatoethylsulfonyl)-phenylamino | Cyanamido | Sulfo | 1.3 | 2.1 | green (672) |
| 71 | N-Ethyl-4-(β-sulfatoethylsulfonyl)-phenylamino | Cyanamido | Sulfo | 1.3 | 2.1 | green (671) |
| 72 | N-Ethyl-3-(β-sulfatoethylsulfonyl)-phenylamino | Cyanamido | Sulfo | 1.3 | 2.1 | green (671) |
| 73 | 2-Sulfo-5-(β-sulfatoethylsulfonyl)-phenylamino | Cyanamido | Sulfo | 1.3 | 2.1 | green (673) |
| 74 | 3-(β-Sulfatoethylsulfonyl)-propylamino | Cyanamido | Sulfo | 1.3 | 2.1 | green (670) |
| 75 | 3-(β-Chloroethylsulfonyl)-propylamino | Cyanamido | Sulfo | 1.3 | 2.1 | green (670) |
| 76 | β-(β'-Sulfatoethylsulfonyl)-ethylamino | Cyanamido | Sulfo | 1.3 | 2.1 | green (670) |
| 77 | β-(β'-Chloroethylsulfonyl)-ethylamino | Cyanamido | Sulfo | 1.3 | 2.1 | green (670) |
| 78 | β-[β'-(β''-Sulfatoethylsulfonyl)-ethoxy]-ethylamino | Cyanamido | Sulfo | 1.3 | 2.1 | green (670) |
| 79 | β-[β'-(β''-Chloroethylsulfonyl)-ethoxy]-ethylamino | Cyanamido | Sulfo | 1.3 | 2.1 | green (670) |
| 80 | N-Ethyl-4-(β-sulfatoethylsulfonyl)-phenylamino | N-Ethyl-β-sulfoethylamino | Sulfo | 1.3 | 2.1 | green (671) |
| 81 | 2-Sulfo-5-(β-sulfatoethylsulfonyl)-phenylamino | N-Ethyl-β-sulfoethylamino | Sulfo | 1.3 | 2.1 | green (673) |
| 82 | 4-(β-Sulfatoethylsulfonyl)-phenylamino | N-Ethyl-β-sulfoethylamino | Sulfo | 1.3 | 2.1 | green (672) |
| 83 | 3-(β-Sulfatoethylsulfonyl)-phenylamino | N-Ethyl-β-sulfoethylamino | Sulfo | 1.3 | 2.1 | green (672) |
| 84 | N-Ethyl-3-(β-sulfatoethylsulfonyl)-phenylamino | N-Ethyl-β-sulfoethylamino | Sulfo | 1.3 | 2.1 | green (671) |
| 85 | β-(β'-Chloroethylsulfonyl)-ethylamino | Chlorine | Sulfo | 1.3 | 2.1 | green (670) |
| 86 | β-[β'-(β''-Sulfatoethylsulfonyl)-ethoxy]-ethylamino | Chlorine | H | 1.3 | 2.1 | green (670) |
| 87 | β-(β'-Chloroethylsulfonyl)-ethylamino | Chlorine | H | 1.3 | 2.1 | green (669) |

EXAMPLE 88

A mixture of 156 parts of chlorosulfonyl-copper phthalocyanine-monocarboxylic acid chloride (having on average 2.5 sulfonyl chloride groups per molecule, from Example D), 30 parts of 1,2-diaminoethane and 400 parts of water is stirred at 20° to 50° C. for about 12 hours, while maintaining a pH of 5 to 7. The batch is then cooled, 95 parts of cyanuric chloride are added at 0° to 10° C. and the reaction is brought to completion within this temperature range and at a pH of 4 to 6. 145 parts of 4-(β-sulfatoethylsulfonyl)-aniline are then added, and the second condensation reaction is carried out at a temperature between 0° and 40° C. and at a pH of between 3 and 6 for about 4 hours.

The copper phthalocyanine dyestuff according to the invention synthesized in this manner, the chemical constitution of which can be represented by formula (23), written in the form of the free acid (for the formula, cf. the formulae sheets after the last Example), is isolated from the synthesis solution by evaporation, spray drying or salting out with an electrolyte salt. It has an absorption maximum in the visible range at 672 nm and is distinguished by very good fiber-reactive dyestuff properties. Deep-colored, fast, green to turquoise blue dyeings and prints are obtained by the dyeing procedures customary in the art for fiber-reactive dyestuffs.

EXAMPLE 89

To prepare a copper phthalocyanine dyestuff according to the invention, the procedure followed is as according to the procedure of Example 88, but instead of the 4-(β-sulfatoethylsulfonyl)-aniline, isomeric 3-(β-sulfatoethylsulfonyl)-aniline is used here as one of the starting compounds.

A dyestuff having practically the same quality as that of Example 88 is obtained. It has an absorption maximum in the visible range at 672 nm and, for example, produces deep-colored, fast, green to turquoise blue dyeings on cotton.

EXAMPLE 90

A mixture of 156 parts of a chlorosulfonyl-copper phthalocyanine-carboxylic acid chloride (having on average 1 carboxylic acid chloride group and 2.5 sulfonic acid chloride groups per molecule), 30 parts of 1,2-diaminoethane and 400 parts of water are stirred at a temperature of 20° to 50° C. for about 12 hours, while maintaining a pH of 5 to 7.

In a separate batch, 95 parts of cyanuric chloride are reacted with 21 parts of cyanamide in 800 parts of water at 0° to 10° C. and at a pH of 8 to 10. When the reaction has ended, 145 parts of 4-(β-sulfatoethylsulfonyl)aniline are added to this solution, and the second condensation reaction is carried out at 0° to 40° C. and at a pH of 3 to 6 for several hours.

The batch containing the chlorotriazine compound and the solution containing the copper phthalocyanine compound are brought together, and the condensation reaction between the two compounds is carried out at a pH of 3 to 7 and at a temperature of 40° to 90° C. for about 10 hours.

The copper phthalocyanine dyestuff according to the invention is isolated from the resulting clear blue-green solution by evaporation, spray drying or salting out with an electrolyte salt. Its chemical structure can be represented by formula (24), written in the form of the free acid (for the formula, cf. the formulae sheets after the last Example). It has an absorption maximum in the visible range at 672 nm and is distinguished by very good fiber-reactive dyestuff properties. By the dyeing procedures customary in the art for fiber-reactive dyestuffs, it produces deep-colored, fast, green to turquoise blue dyeings and prints on the materials mentioned in the description, such as, for example, cellulose fiber materials.

EXAMPLE 91

156 parts of the copper phthalocyanine-monocarboxylic acid chloride containing chlorosulfonyl groups from Example D and 30 parts of 1,2-diaminoethane are stirred into 400 parts of water, and the reaction is carried out at a temperature between 20° and 50° C. for 10 to 15 hours, while maintaining a pH of 5 to 7.

In a separate operation, 95 parts of cyanuric chloride are reacted with 21 parts of cyanamide at a temperature between 0° and 10° C. and at a pH of 8 to 10; 145 parts of 3-(β-sulfatoethylsulfonyl)-aniline are then added, and the second condensation reaction is carried out at a temperature between 0° and 40° C. and at a pH of between 3 and 6. When the reaction has ended, the solution is added to the batch containing the phthalocyanine compound, and the reaction of the phthalocyanine compound containing amino groups with the monochlorotriazine compound is carried out at a pH of 3 to 7 and at a temperature of 40° to 90° C. for about 10 hours.

The phthalocyanine dyestuff according to the invention is isolated from the clear blue-green solution by evaporation or by salting out. It corresponds to formula (25), written in the form of the free acid (for the formula, cf. the formulae sheets after the last Example), and has an absorption maximum in the visible range at 672 nm. It is distinguished by very good fiber-reactive dyestuff properties, and dyes the materials mentioned in the description, such as, in particular, cellulose fiber materials, in deep-colored, fast, green to turquoise blue shades by the use processes customary in the art for fiber-reactive dyestuffs.

EXAMPLES 92 TO 133

Further phthalocyanine dyestuffs according to the invention corresponding to the general formula (B) (for the formula, cf. the formulae sheets after the last Example) are described with the aid of their formula components in the following Tabular Examples. They can be prepared in the manner according to the invention, for example in accordance with one of the above Embodiment Examples, by means of their components which can be seen from the particular Tabular Example in association with formula (B) (thus a copper phthalocyanine-mono- or -dicarboxylic acid chloride containing sulfonyl groups and optionally . sulfo groups, cyanuric chloride or a 2,4-dichloro-s-triazine substituted in the 6-position, an amino compound corresponding to the general formula (2) mentioned in the description and 1,2-diamino-ethane). They have fiber-reactive dyestuff properties and produce, in particular on cellulose fiber materials, deep-colored, fast dyeings and prints in the color shade stated for dyeings on cotton in the particular Tabular Example by the application and fixing methods customary for fiber-reactive dyestuffs.

| Example | Radical $R^4$ | W | A | (C + D) | Color Shade |
|---|---|---|---|---|---|
| 92 | 2-(β-Sulfatoethylsulfonyl)-phenylamino | Chlorine | 1.7 | 1.8 | green (673) |
| 93 | 2-Methoxy-5-(β-sulfatoethylsulfonyl)-phenylamino | Chlorine | 1.7 | 1.8 | green (672) |
| 94 | 2-Methoxy-4-(β-sulfatoethylsulfonyl)-phenylamino | Chlorine | 1.7 | 1.8 | green (662) |
| 95 | N-Ethyl-4-(β-sulfatoethylsulfonyl)-phenylamino | Chlorine | 1.7 | 1.8 | green (662) |
| 96 | N-Ethyl-3-(β-sulfatoethylsulfonyl)-phenylamino | Chlorine | 1.7 | 1.8 | green (662) |
| 97 | 2-Sulfo-5-(β-sulfatoethylsulfonyl)-phenylamino | Chlorine | 1.7 | 1.8 | green (674) |
| 98 | 2-Carboxy-5-(β-sulfatoethylsulfonyl)- | Chlorine | 1.7 | 1.8 | green (675) |

-continued

| Example | Radical R$^4$ | W | A | (C + D) | Color Shade |
|---|---|---|---|---|---|
| 99 | 2-Hydroxy-5-($\beta$-sulfatoethylsulfonyl)-phenylamino | Chlorine | 1.7 | 1.8 | green (673) |
| 100 | 2-Hydroxy-4-($\beta$-sulfatoethylsulfonyl)-phenylamino | Chlorine | 1.7 | 1.8 | green (673) |
| 101 | 3-($\beta$-Sulfatoethylsulfonyl)-propylamino | Chlorine | 1.7 | 1.8 | green (671) |
| 102 | 3-($\beta$-Chloroethylsulfonyl)-propylamino | Chlorine | 1.7 | 1.8 | green (671) |
| 103 | $\beta$-[4-($\beta'$-Sulfatoethylsulfonyl)-phenyl]-ethylamino | Chlorine | 1.7 | 1.8 | green (672) |
| 104 | $\beta$-[3-Sulfo-4-($\beta'$-sulfatoethylsulfonyl)-phenyl]-ethylamino | Chlorine | 1.7 | 1.8 | green (674) |
| 105 | Bis-[$\beta$-($\beta'$-chloroethylsulfonyl)-ethyl]-amino | Chlorine | 1.7 | 1.8 | green (673) |
| 106 | 3,4-Di-($\beta$-sulfatoethylsulfonyl)-phenylamino | Chlorine | 1.7 | 1.8 | green (674) |
| 107 | 2,5-Di-($\beta$-sulfatoethylsulfonyl)-phenylamino | Chlorine | 1.7 | 1.8 | green (674) |
| 108 | $\beta$-($\beta'$-Sulfatoethylsulfonyl)-ethylamino | Chlorine | 1.7 | 1.8 | green (670) |
| 109 | $\beta$-($\beta'$-Chloroethylsulfonyl)-ethylamino | Chlorine | 1.7 | 1.8 | green (670) |
| 110 | $\beta$-[$\beta'$($\beta''$-Sulfatoethylsulfonyl)-ethoxy]-ethylamino | Chlorine | 1.7 | 1.8 | green (670) |
| 111 | $\beta$-[$\beta'$($\beta''$-Chloroethylsulfonyl)-ethoxy]-ethylamino | Chlorine | 1.7 | 1.8 | green (670) |
| 112 | 4-($\beta$-Sulfatoethylsulfonyl)-phenylamino | Methoxy | 1.7 | 1.8 | green (673) |
| 113 | 3-($\beta$-Sulfatoethylsulfonyl)-phenylamino | Methoxy | 1.7 | 1.8 | green (673) |
| 114 | N-Ethyl-4-($\beta$-sulfatoethylsulfonyl)-phenylamino | Cyanamido | 1.7 | 1.8 | green (672) |
| 115 | N-Ethyl-3-($\beta$-sulfatoethylsulfonyl)-phenylamino | Cyanamido | 1.7 | 1.8 | green (672) |
| 116 | 2-Sulfo-5-($\beta$-sulfatoethylsulfonyl)-phenylamino | Cyanamido | 1.7 | 1.8 | green (675) |
| 117 | 3-($\beta$-Sulfatoethylsulfonyl)-propylamino | Cyanamido | 1.7 | 1.8 | green (670) |
| 118 | 3-($\beta$-Chloroethylsulfonyl)-propylamino | Cyanamido | 1.7 | 1.8 | green (670) |
| 119 | $\beta$-($\beta$-Sulfatoethylsulfonyl)-ethylamino | Cyanamido | 1.7 | 1.8 | green (671) |
| 120 | $\beta$-($\beta'$-Chloroethylsulfonyl)-ethylamino | Cyanamido | 1.7 | 1.8 | green (671) |
| 121 | $\beta$-[$\beta'$-($\beta''$-Sulfatoethylsulfonyl)-ethoxy]-ethylamino | Cyanamido | 1.7 | 1.8 | green (671) |
| 122 | $\beta$-[$\beta'$-($\beta''$-Chloroethylsulfonyl)-ethoxy]-ethylamino | Cyanamido | 1.7 | 1.8 | green (671) |
| 123 | 4-($\beta$-Sulfatoethylsulfonyl)-phenylamino | N-Ethyl-$\beta$-sulfoethylamino | 1.7 | 1.8 | green (674) |
| 124 | 3-($\beta$-Sulfatoethylsulfonyl)-phenylamino | N-Ethyl-$\beta$-sulfoethylamino | 1.7 | 1.8 | green (674) |
| 125 | N-Ethyl-4-($\beta$-sulfatoethylsulfonyl)-phenylamino | N-Ethyl-$\beta$-sulfoethylamino | 1.7 | 1.8 | green (672) |
| 126 | N-Ethyl-3-($\beta$-sulfatoethylsulfonyl)-phenylamino | N-Ethyl-$\beta$-sulfoethylamino | 1.7 | 1.8 | green (672) |
| 127 | 2-Sulfo-4-($\beta$-sulfatoethylsulfonyl)-phenylamino | N-Ethyl-$\beta$-sulfoethylamino | 1.7 | 1.8 | green (675) |
| 128 | 3-($\beta$-Sulfatoethylsulfonyl)-propylamino | N-Ethyl-$\beta$-sulfoethylamino | 1.7 | 1.8 | green (672) |
| 129 | 3-($\beta$-Chloroethylsulfonyl)-propylamino | N-Ethyl-$\beta$-sulfoethylamino | 1.7 | 1.8 | green (672) |
| 130 | $\beta$-($\beta'$-Sulfatoethylsulfonyl)-ethylamino | N-Ethyl-$\beta$-sulfoethylamino | 1.7 | 1.8 | green (672) |
| 131 | $\beta$-($\beta'$-Chloroethylsulfonyl)-ethylamino | N-Ethyl-$\beta$-sulfoethylamino | 1.7 | 1.8 | green (672) |
| 132 | $\beta$-[$\beta'$($\beta''$-Sulfatoethylsulfonyl)-ethoxy]-ethylamino | N-Ethyl-$\beta$-sulfoethylamino | 1.7 | 1.8 | green (672) |
| 133 | $\beta$-[$\beta'$($\beta''$-Chloroethylsulfonyl)-ethoxy]-ethylamino | N-Ethyl-$\beta$-sulfoethylamino | 1.7 | 1.8 | green (672) |

EXAMPLE 134

156 parts of copper phthalocyanine-tetracarboxylic acid chloride and 75 parts of 3-acetylaminoaniline are stirred into 500 parts of water; the reaction is carried out at a temperature of 40° to 70° C. for about 10 hours, while maintaining a pH of 5 to 7. 357 parts of concentrated sulfuric acid are then added, and the batch is stirred at 80° to 90° C. for a further 3 to 5 hours. The batch is cooled, 95 parts of cyanuric chloride are added, and the further reaction is carried out at a temperature of 0° to 10° C. and at a pH of 4 to 6. After subsequent addition of 145 parts of 4-($\beta$-sulfatoethylsulfonyl)-aniline, the second condensation reaction is carried out at a temperature between 0° and 40° C. and at a pH of 3 to 6 for about 4 hours.

The resulting copper phthalocyanine dyestuff according to the invention, to which formula (26), written in the form of the free acid (for the formula, cf. the formulae sheets after the last Example), can be given, is isolated from the clear blue-green solution by evaporation or salting out. It has an absorption maximum in the visible range at 671 nm, and produces deep-colored, fast green to turquoise blue dyeings and prints by the use processes customary in the art for fiber-reactive dyestuffs.

EXAMPLE 135

To prepare a copper phthalocyanine dyestuff according to the invention, the procedure followed is as according to the procedure of Example 13, but instead of the 4-($\beta$-sulfatoethylsulfonyl)-aniline, the same amount of 3-($\beta$-sulfatoethylsulfonyl)-aniline is employed as one of the starting compounds.

The copper phthalocyanine dyestuff according to the invention thus obtained, which is isomeric to the dyestuff of Example 134 in this amino component, has an absorption maximum in the visible range at 671 nm and dyes the materials mentioned in the description, such as, in particular, cellulose fiber materials, in green to turquoise blue shades having good fastness properties by the dyeing and printing processes customary for fiber-reactive dyestuffs.

EXAMPLE 136

To prepare a copper phthalocyanine dyestuff according to the invention, copper phthalocyanine-tetracarboxylic acid chloride is first reacted with 3-acetylaminoaniline in 1000 parts of water in accordance with the information in Example 134, and the acetylamino group is then hydrolyzed to the amino group by means of sulfuric acid as described in Example 134.

In a separate batch, 95 parts of cyanuric chloride are reacted with 21 parts of cyanamide at 0° to 10° C. and at a pH of 8 to 10, and then with 145 parts of 4-($\beta$-sulfatoethylsulfonyl)-aniline at 0° to 40° C. and at a pH of 3 to 6 (cf. Example 91). The two reaction batches are combined, and the reaction of the copper phthalocyanine compound containing amino groups with the chlorotriazine compound is carried out at a pH of 3 to 7 and a temperature of 40° to 90° C. for about 8 hours.

The copper phthalocyanine dyestuff according to the invention which, in the form of the free acid, corresponds to formula (27) (for the formula, cf. the formulae sheets after the last Example) is isolated from the clear blue-green synthesis solution. It has an absorption maximum in the visible range at 671 nm, has fiber-reactive properties, and produces deep-colored, fast, green to turquoise blue dyeings and prints on the materials mentioned in the description, such as, in particular, cellulose fiber materials, by the use processes customary in the art for fiber-reactive dyestuffs.

EXAMPLE 137

To prepare a copper phthalocyanine dyestuff according to the invention, the procedure followed is as according to the procedure of Example 136, but instead of the 4-($\beta$-sulfatethylsulfonyl)-aniline, the same amount of 3-($\beta$-sulfatoethylsulfonyl)-aniline is employed as one of the starting compounds.

The copper phthalocyanine dyestuff according to the invention thus obtained, which is isomeric to the dyestuff of Example 136 in this amino component, has an absorption maximum in the visible range at 671 nm, and dyes the materials mentioned in the description, such as, in particular, cellulose fiber materials, in green to turquoise blue shades having good fastness properties by the dyeing and printing processes customary for fiber-reactive dyestuffs.

EXAMPLES 138 TO 177

Further phthalocyanine dyestuffs according to the invention corresponding to the general formula (C) (for the formula, cf. the formulae sheets after the last Example) are described with the aid of their formula components in the following Tabular Examples. They can be prepared in the manner according to the invention, for example in accordance with one of the above Embodiment Examples, by means of their components which can be seen from the particular Tabular Example in association with the formula (C) (a copper phthalocyanine-tetracarboxylic acid chloride, cyanuric chloride or a 2,4-dichloro-s-triazine substituted in the 6-position, an amino compound corresponding to the general formula (2) given in the description, cyanamide and 1,3-diaminobenzene). They have fiber-reactive dyestuff properties and produce, in particular on cellulose fiber materials, deep-colored, fast dyeings and prints in the color shade stated for dyeings on cotton in the particular tabular example by the application and fixing methods customary for fiber-reactive dyestuffs.

| Example | Radical R$^4$ | W | A | D | Color shade |
|---|---|---|---|---|---|
| 138 | 2-($\beta$-Sulfatoethylsulfonyl)-phenylamino | Chlorine | 1.0 | 2.5 | green (672) |
| 139 | 2-Methoxy-5-($\beta$-sulfatoethylsulfonyl)-phenylamino | Chlorine | 1.0 | 2.5 | green (671) |
| 140 | 2-Methoxy-4-($\beta$-sulfatoethylsulfonyl)-phenylamino | Chlorine | 1.0 | 2.5 | green (671) |
| 141 | N-Ethyl-4-($\beta$-sulfatoethylsulfonyl)-phenylamino | Chlorine | 1.0 | 2.5 | green (671) |
| 142 | N-Ethyl-3-($\beta$-sulfatoethylsulfonyl)-phenylamino | Chlorine | 1.0 | 2.5 | green (671) |
| 143 | 2-Sulfo-5-($\beta$-sulfatoethylsulfonyl)-phenylamino | Chlorine | 1.0 | 2.5 | green (673) |
| 144 | 2-Carboxy-5-($\beta$-sulfatoethylsulfonyl)-phenylamino | Chlorine | 1.0 | 2.5 | green (674) |
| 145 | 2-Hydroxy-5-($\beta$-sulfatoethylsulfonyl)-phenylamino | Chlorine | 1.0 | 2.5 | green (672) |
| 146 | 2-Hydroxy-4-($\beta$-sulfatoethylsulfonyl)-phenylamino | Chlorine | 1.0 | 2.5 | green (672) |
| 147 | 3-($\beta$-Sulfatoethylsulfonyl)-propylamino | Chlorine | 1.0 | 2.5 | green (671) |
| 148 | 3-($\beta$-Chloroethylsulfonyl)-propylamino | Chlorine | 1.0 | 2.5 | green (671) |
| 149 | $\beta$-[4-($\beta'$-Sulfatoethylsulfonyl)-phenyl]-ethylamino | Chlorine | 1.0 | 2.5 | green (671) |
| 150 | $\beta$-[3-Sulfo-4-($\beta'$-sulfatoethylsulfonyl)-phenyl]-ethylamino | Chlorine | 1.0 | 2.5 | green (673) |
| 151 | Bis-[$\beta$-($\beta'$-chloroethylsulfonyl)-ethyl]-amino | Chlorine | 1.0 | 2.5 | green (671) |
| 152 | 3,4-Di-($\beta$-sulfatoethylsulfonyl)-phenylamino | Chlorine | 1.0 | 2.5 | green (672) |

-continued

| Example | Radical $R^4$ | W | A | D | Color shade |
|---|---|---|---|---|---|
| 153 | 2,5-Di-($\beta$-sulfatoethylsulfonyl)-phenylamino | Chlorine | 1.0 | 2.5 | green (673) |
| 154 | $\beta$-($\beta'$-Sulfatoethylsulfonyl)-ethylamino | Chlorine | 1.0 | 2.5 | green (671) |
| 155 | $\beta$-($\beta'$-Chloroethylsulfonyl)-ethylamino | Chlorine | 1.0 | 2.5 | green (671) |
| 156 | 4-($\beta$-Sulfatoethylsulfonyl)-phenylamino | Methoxy | 1.0 | 2.5 | green (672) |
| 157 | 3-($\beta$-Sulfatoethylsulfonyl)-phenylamino | Methoxy | 1.0 | 2.5 | green (672) |
| 158 | N-Ethyl-4-($\beta$-sulfatoethylsulfonyl)-phenylamino | Cyanamido | 1.0 | 2.5 | green (672) |
| 159 | N-Ethyl-3-($\beta$-sulfatoethylsulfonyl)-phenylamino | Cyanamido | 1.0 | 2.5 | green (672) |
| 160 | 2-Sulfo-5-($\beta$-sulfatoethylsulfonyl)-phenylamino | Cyanamido | 1.0 | 2.5 | green (674) |
| 161 | 3-($\beta$-Sulfatoethylsulfonyl)-propylamino | Cyanamido | 1.0 | 2.5 | green (670) |
| 162 | 3-($\beta$-Chloroethylsulfonyl)-propylamino | Cyanamido | 1.0 | 2.5 | green (670) |
| 163 | $\beta$-($\beta'$-Sulfatoethylsulfonyl)-ethylamino | Cyanamido | 1.0 | 2.5 | green (671) |
| 164 | $\beta$-($\beta'$-Chloroethylsulfonyl)-ethylamino | Cyanamido | 1.0 | 2.5 | green (671) |
| 165 | $\beta$-[$\beta'$-($\beta''$-Sulfatoethylsulfonyl)-ethoxy]-ethylamino | Cyanamido | 1.0 | 2.5 | green (671) |
| 166 | $\beta$-[$\beta'$-($\beta''$-Chloroethylsulfonyl)-ethoxy]-ethylamino | Cyanamido | 1.0 | 2.5 | green (671) |
| 167 | 4-($\beta$-Sulfatoethylsulfonyl)-phenylamino | N-Ethyl-$\beta$-sulfoethylamino | 1.0 | 2.5 | green (673) |
| 168 | 3-($\beta$-Sulfatoethylsulfonyl)-phenylamino | N-Ethyl-$\beta$-sulfoethylamino | 1.0 | 2.5 | green (673) |
| 169 | N-Ethyl-4-($\beta$-sulfatoethylsulfonyl)-phenylamino | N-Ethyl-$\beta$-sulfoethylamino | 1.0 | 2.5 | green (672) |
| 170 | N-Ethyl-3-($\beta$-sulfatoethylsulfonyl)-phenylamino | N-Ethyl-$\beta$-sulfoethylamino | 1.0 | 2.5 | green (672) |
| 171 | 2-Sulfo-4-($\beta$-sulfatoethylsulfonyl)-phenylamino | N-Ethyl-$\beta$-sulfoethylamino | 1.0 | 2.5 | green (675) |
| 172 | 3-($\beta$-Sulfatoethylsulfonyl)-propylamino | N-Ethyl-$\beta$-sulfoethylamino | 1.0 | 2.5 | green (671) |
| 173 | 3-($\beta$-Chloroethylsulfonyl)-propylamino | N-Ethyl-$\beta$-sulfoethylamino | 1.0 | 2.5 | green (671) |
| 174 | $\beta$-($\beta'$-Sulfatoethylsulfonyl)-ethylamino | N-Ethyl-$\beta$-sulfoethylamino | 1.0 | 2.5 | green (671) |
| 175 | $\beta$-($\beta'$-Chloroethylsulfonyl)-ethylamino | N-Ethyl-$\beta$-sulfoethylamino | 1.0 | 2.5 | green (672) |
| 176 | $\beta$-[$\beta'$-($\beta''$-Sulfatoethylsulfonyl)-ethoxy]-ethylamino | N-Ethyl-$\beta$-sulfoethylamino | 1.0 | 2.5 | green (671) |
| 177 | $\beta$-[$\beta'$-($\beta''$-Chloroethylsulfonyl)-ethoxy]-ethylamino | N-Ethyl-$\beta$-sulfoethylamino | 1.0 | 2.5 | green (671) |

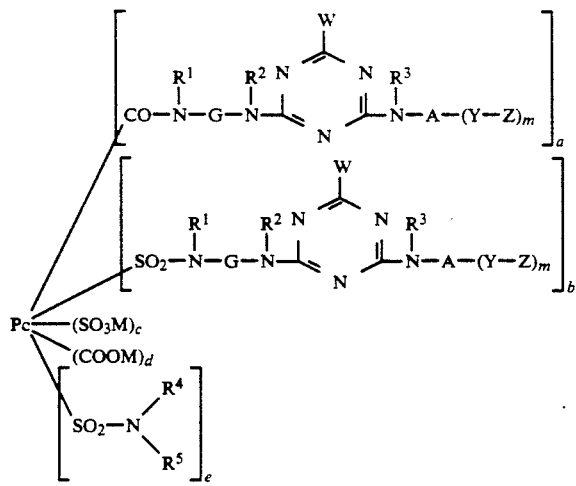

(1)

(2)

(3)

(4)
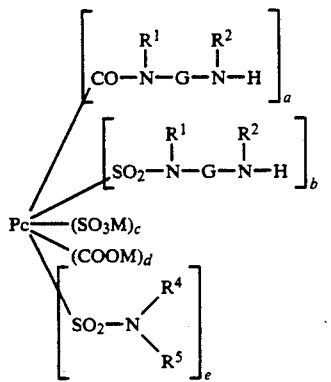
(5)
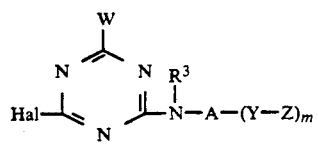
(6)
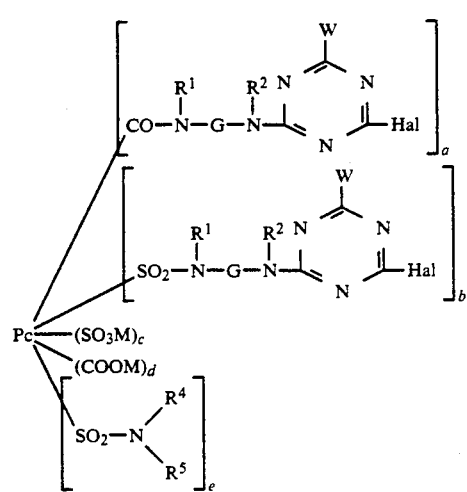
(7)
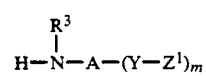
(8)
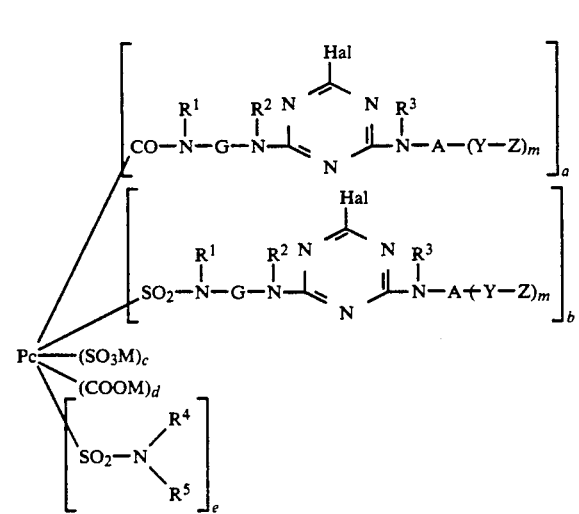

-continued
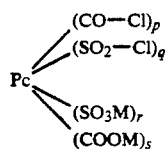 (9)
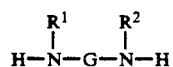 (10)
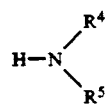 (11)
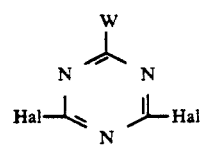 (12)
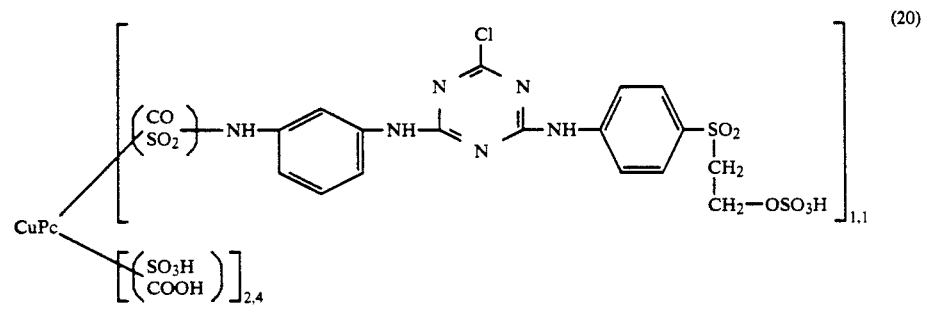 (20)
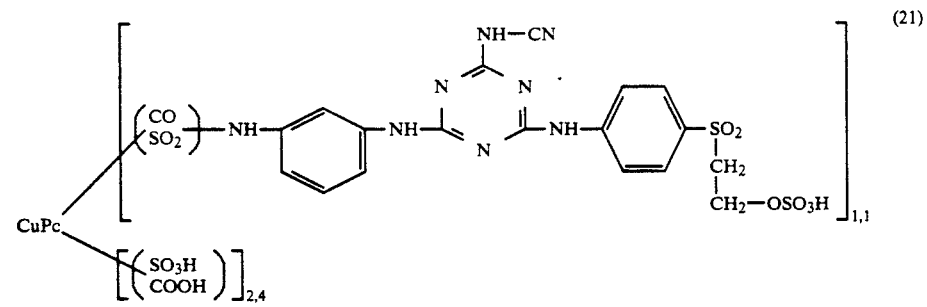 (21)
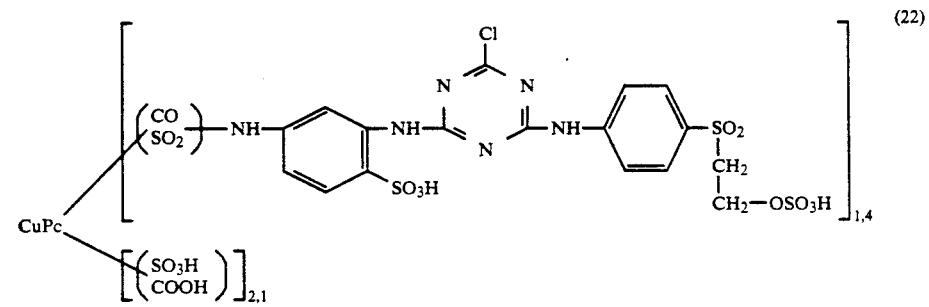 (22)

-continued
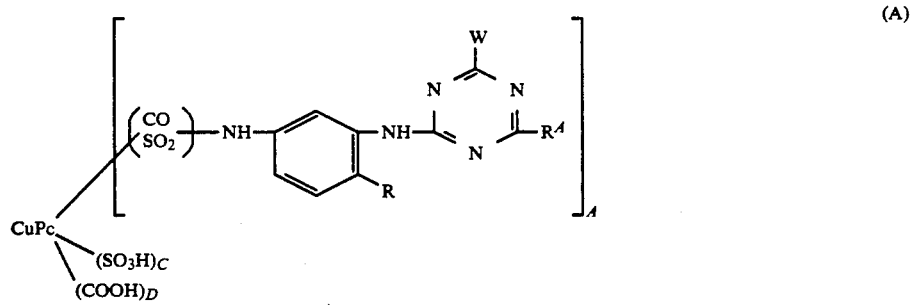
(A)
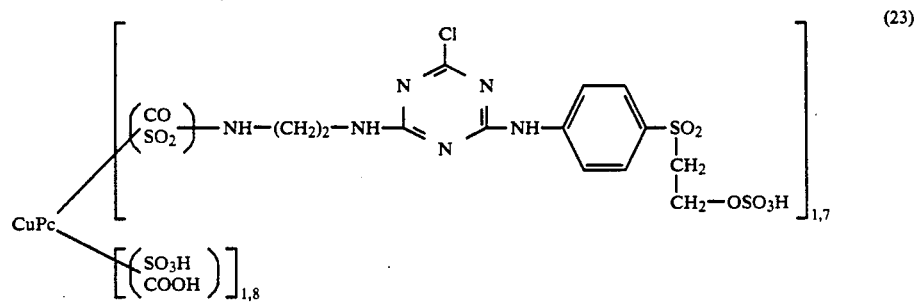
(23)
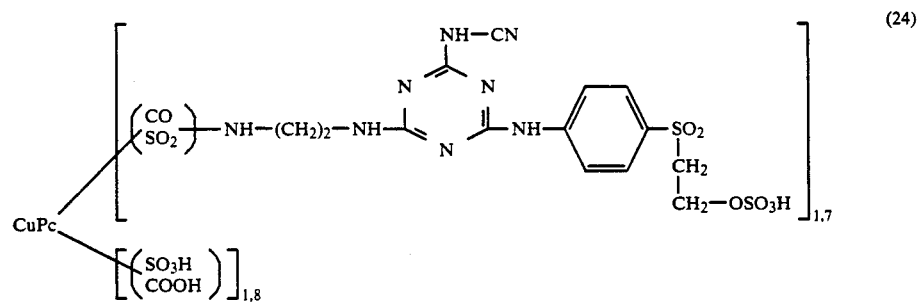
(24)
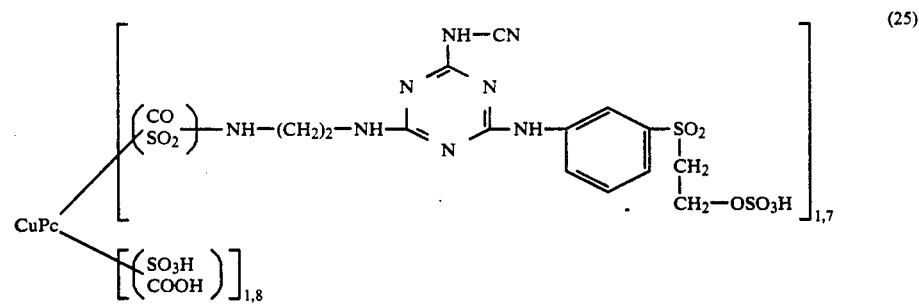
(25)
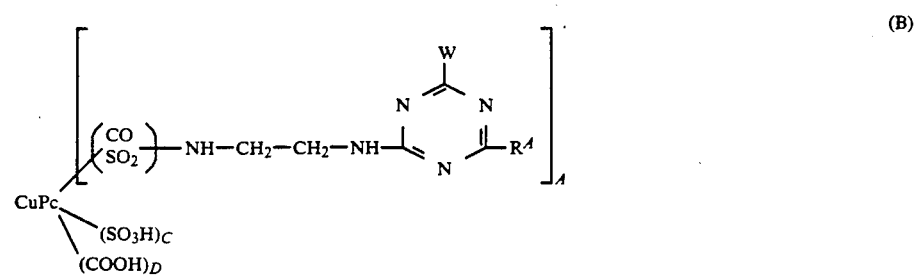
(B)

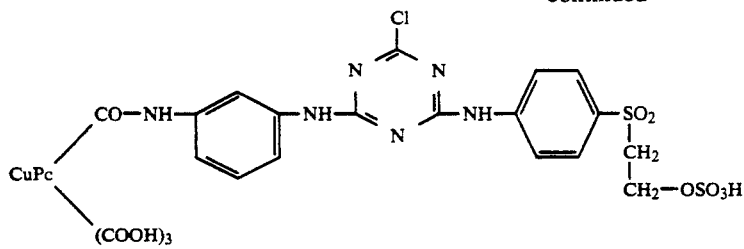

(26)

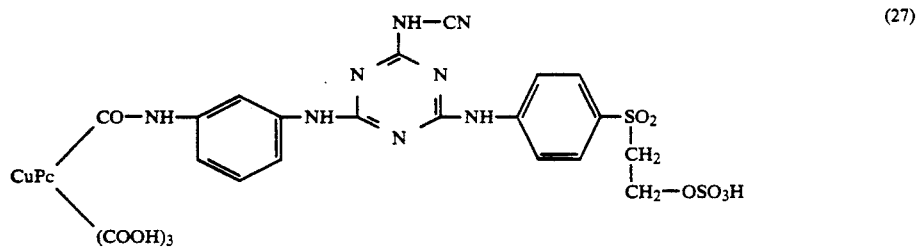

(27)

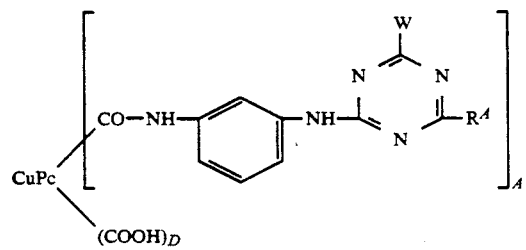

(C)

We claim:

1. A water soluble phthalocyanine dyestuff of the formula (1)

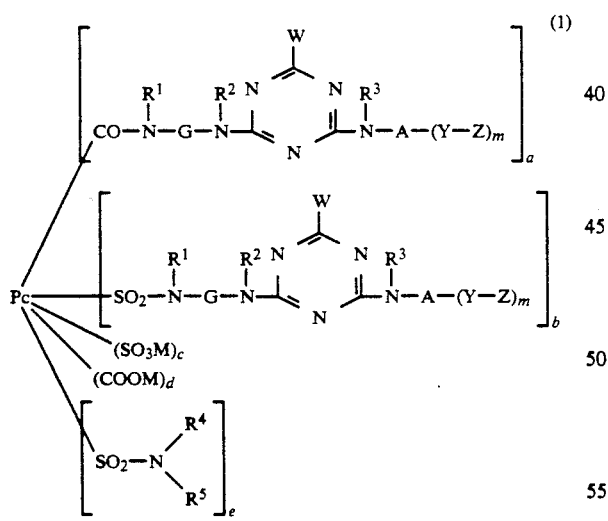

(1)

in which:

Pc is the radical of phthalocyanine, of a copper phthalocyanine, cobalt phthalocyanine or nickel phthalocyanine, in which the carboxy, carboxamide, sulfonamide and sulfo groups are bonded in the 3- and 4-positions, or both, of the carbocyclic aromatic rings of the phthalocyanine, and in which the phthalocyanine is unsubstituted or substituted in the 3- or 4-positions, or both, of the carbocyclic aromatic rings of the phthalocyanine by one or more other substituents selected from the group consisting of halogen and phenyl radicals;

$R^1$ is hydrogen or alkyl of 1 to 6 carbon atoms unsubstituted or substituted by hydroxy, alkoxy of 1 to 6 carbon atoms, chlorine, sulfato, cyano, sulfo, carboxy, phenyl, sulfonphenyl and carboxyphenyl;

$R^2$ is hydrogen or alkyl of 1 to 6 carbon atoms unsubstituted or substituted by hydroxy, alkoxy of 1 to 6 carbon atoms, chlorine, sulfato, cyano, sulfo, carboxy, phenyl, sulfophenyl and carboxyphenyl;

$R^3$ is hydrogen or alkyl or 1 to 4 carbon atoms;

$R^4$ is hydrogen or alkyl of 1 to 6 carbon atoms unsubstituted or substituted by hydroxy, alkoxy of 1 to 6 carbon atoms, chlorine, sulfato, cyano, sulfo, carboxy, phenyl, sulfophenyl and carboxyphenyl, or is cyclalkyl of 5 to 8 carbon atoms;

$R^5$ is hydrogen or alkyl of 1 to 6 carbon atoms unsubstituted or substituted by hydroxy, alkoxy of 1 to 6 carbon atoms, chlorine, sulfato, cyano, sulfo, carboxy, phenyl, sulfophenyl and carboxyphenyl, or is naphthyl unsubstituted or substituted by sulfo, or is phenyl unsubstituted by substituted by substituents selected from the group consisting of methyl, ethyl, methoxy, ethoxy, chlorine, carboxy and sulfo, or is cyano; or $R^4$ and $R^5$, together with the nitrogen atom and an alkylene having 3 to 8 carbon atoms or with a further hetero atom selected from the group consisting of nitrogen and oxygen and two alkylenes of 1 to 4 carbon atoms form the radical of 4- to 8-mentioned heterocyclic ring, or —$NR^4R^3$ is a radical of the formula (2),

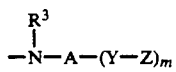

in which $R^3$ is as defined above and A, Y, Z and m have one of the meanings given below;

G is alkylene having 1 to 6 carbon atoms, or is phenylene unsubstituted or substituted by 1 to 4 substituents selected from the group consisting of alkyl having 1 to 4 carbon atoms, alkoxy having 1 to 4 carbon atoms, halogen, sulfo, carboxy and nitro, or the grouping $-N(R^1)-G-N(R^2)-$ together forms the 1,4-piperazidinylene group;

W is halogen, alkoxy having 1 to 4 carbon atoms, aryloxy, sulfo, phenylsulfonyl, alkylsulfonyl having 1 to 4 carbon atoms or an amino group of the formula $-NR^6R^7$, in which $R^6$ has one of the meanings given above for $R^4$, and $R^7$ has one of the meanings given above for $R^5$, or W is a group of the abovementioned formula (2) in which $R^3$ is as defined above and A, Y, Z and m have one of the meanings given below;

A is phenylene or naphthylene each unsubstituted or substituted by 1 to 3 substituents selected from the group consisting of alkyl of 1 to 4 carbon atoms, alkoxy of 1 to 4 carbon atoms, halogen, carboxy, nitro and sulfo, or is alkylene of 1 to 8 carbon atoms, or alkylene of 2 to 8 carbon atoms which is interrupted by 1 or 2 hetero groups selected from the group consisting of —O— and —NH—, or is a group of the formula -alkyl-phenylene-, in which alk is an alkylene of 1 to 4 carbon atoms and phenylene is a phenylene group, or A is a group of the formula (3)

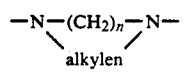

in which n is an integer from 2 to 4 and alkylen is an alkylene having 1 to 6 carbon atoms;

Y is in the case where A is an aromatic radical a direct bond or a group of the formula [-CO-NH-alkylene-]—CO—CN-alkylen- where alkylen has the above meaning, or a group of the formula

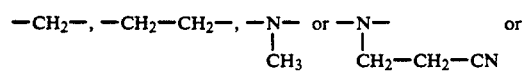

Y is alkylene having 1 to 6 carbon atoms in which case —A— is necessarily a direct bond and m is 2;

Z is vinylsulfonyl or is ethylsulfonyl which contains, in the β-position, a substituent which is eliminated under alkaline conditions, a is an integer from zero to 4,
b is an integer from zero to 3;
c is an integer from zero to 3;
d is an integer from zero to 3;
e is an integer from zero to 2;
the sum of (a+b+c+d+e) is not more than 4;
the sum of (a+b) is 1 to 4;
the sum of (a+d) is 1 to 4;
the sum of (c+d) is zero to 4;
m is the number 1 or 2; and
M is a hydrogen atom or an alkali metal.

2. A phthalocyanine dyestuff as claimed in claim 1, in which W is cyano-amido or chlorine.

3. A phthalocyanine dyestuff as claimed in claim 1, in which Y is a direct bond.

4. A phthalocyanine dyestuff as claimed in 1, in which A is meta- or para-phenylene unsubstituted or substituted by 1 or 2 substituents selected from the group consisting of methyl, ethyl, methoxy, ethoxy, chlorine, carboxy and sulfo.

5. A phthalocyanine dyestuff as claimed in claim 1, in which b, c and e are each the number zero.

6. A phthalocyanine dyestuff as claimed in claim 1, in which A is meta- or para-phenylene.

7. A phthalocyanine dyestuff as claimed in claim 1, in which Z is β-sulfatoethylsulfonyl.

8. A phthalocyanine dyestuff as claimed in claim 1, in which e is the number zero.

9. A phthalocyanine dyestuff as claimed in claim 1, in which $R^4$ and $R^5$ are both hydrogen.

10. A phthalocyanine dyestuff as claimed in claim 1, in which a is zero, 1 or 2.

11. A phthalocyanine dyestuff as claimed in claim 1, in which $R^1$ is hydrogen.

12. A phthalocyanine dyestuff as claimed in claim 1, in which $R^2$ is hydrogen.

13. A phthalocyanine dyestuff as claimed in claim 1, in which $R^3$ is hydrogen.

14. A phthalocyanine dyestuff as claimed in claim 1, in which Pc is copper- or nickelphthalocyanine.

15. A phthalocyanine dyestuff as claimed in claim 1, in which m is 1.

16. A phthalocyanine dyestuff as claimed in claim 1, in which the sum of (a+b) is 1, 2 or 3.

17. The phthalocyanine dyestuff as claimed in claim 1, wherein $R^1$, $R^2$ and $R^3$ are hydrogen.

18. The phthalocyanine dyestuff as claimed in claim 17, wherein a is 1 or 2.

* * * * *

UNITED STATES PATENT AND TRADEMARK OFFICE
CERTIFICATE OF CORRECTION

PATENT NO. : 5,256,776
DATED : October 26, 1993
INVENTOR(S) : Thomas Beck, et. al.

It is certified that error appears in the above-indentified patent and that said Letters Patent is hereby corrected as shown below:

In claim 1 (column 35, line 15) "1,4-piperazidinylene group;" should read --1,4-piperazinylene group--.

In claim 1 (column 34, last line) "-$NR^4R^3$" should read -- -$N^4R^5$--.

Signed and Sealed this

Ninth Day of August, 1994

Attest:

BRUCE LEHMAN

Attesting Officer

Commissioner of Patents and Trademarks